United States Patent [19]

Ikedo et al.

[11] Patent Number: 5,245,602
[45] Date of Patent: Sep. 14, 1993

[54] FRONT LOADING DISK PLAYER

[75] Inventors: Yuji Ikedo; Katsumi Sawada; Hitoshi Ueno; Yasuyuki Tashiro; Keiichi Takagi, all of Tokorozawa, Japan

[73] Assignee: Pioneer Electronic Corporation, Tokyo, Japan

[21] Appl. No.: 832,611

[22] Filed: Feb. 12, 1992

Related U.S. Application Data

[63] Continuation of Ser. No. 248,175, Sep. 23, 1988.

[30] Foreign Application Priority Data

| Mar. 4, 1988 | [JP] | Japan | 63-51192 |
| Mar. 4, 1988 | [JP] | Japan | 63-51193 |
| Mar. 4, 1988 | [JP] | Japan | 63-51194 |
| Mar. 4, 1988 | [JP] | Japan | 63-51195 |

[51] Int. Cl.⁵ .......................... G11B 33/02
[52] U.S. Cl. .................. 369/75.2; 369/77.1; 369/191; 369/34
[58] Field of Search ................ 369/35-38, 369/75.1, 75.2, 77.1, 77.2, 177-180, 191, 196

[56] References Cited

U.S. PATENT DOCUMENTS

| 4,730,291 | 3/1988 | Ikedo et al. | 369/39 X |
| 4,773,057 | 9/1988 | Otsuka et al. | 369/75.2 |
| 4,797,865 | 1/1989 | Imai et al. | 369/39 |
| 4,845,700 | 5/1989 | Koizumi et al. | 369/75.2 |

FOREIGN PATENT DOCUMENTS

| 0026152 | 4/1981 | European Pat. Off. |
| 0109710 | 5/1984 | European Pat. Off. |
| 0173136 | 3/1986 | European Pat. Off. |
| 0240926 | 10/1987 | European Pat. Off. |
| 58-203669 | 11/1983 | Japan |
| 2137797 | 10/1984 | United Kingdom |

Primary Examiner—William M. Shoop, Jr.
Assistant Examiner—David Martin
Attorney, Agent, or Firm—Keck, Mahin & Cate

[57] ABSTRACT

A front loading disc player for automatically delivering a disc onto a turntable and playing back the disc includes a disc delivery mechanism for delivering the disc. The disc delivery mechanisms has two trays for carrying respective discs, juxtaposed in a direction substantially normal to the disc carrying surface of the turntable and movable into a projected position out of the player housing and a retracted position in the player housing, and a guide and driver means for guiding and moving the trays into the playback position, the retracted position, and the projected position. While one of the trays is in the playback position, the other tray is positioned in either the stored position or the projected position. While the disc delivered by one of the trays onto the turntable is being played back, therefore, the disc on the other tray can be replaced with a new disc, so that a number of discs can successively be played back.

15 Claims, 34 Drawing Sheets

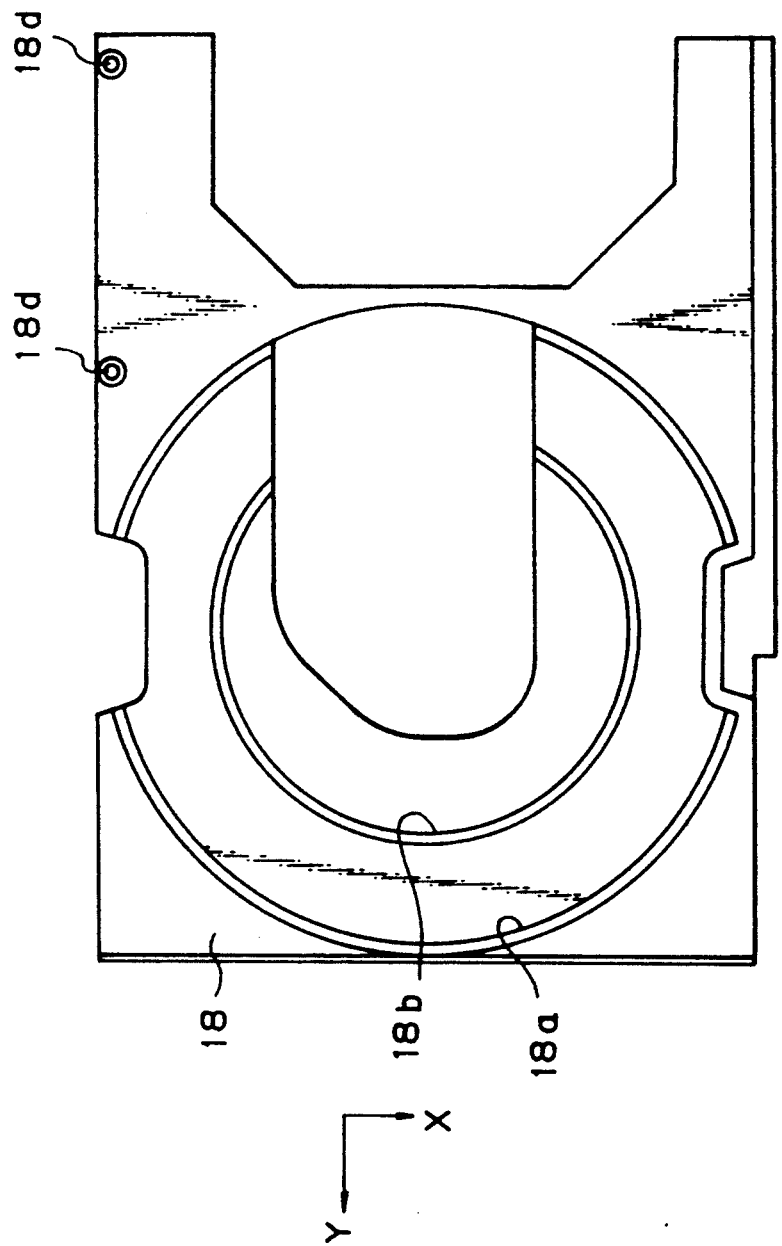

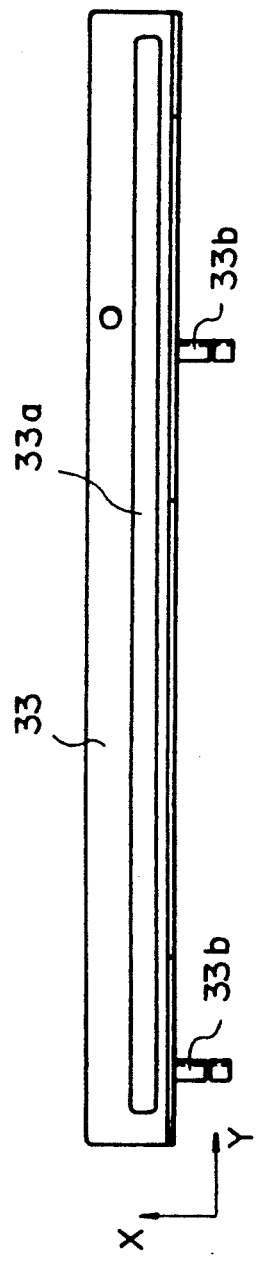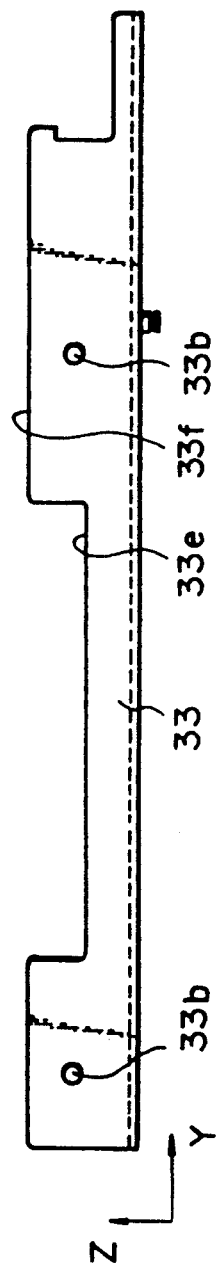
Fig. 9(a)
Fig. 9(b)

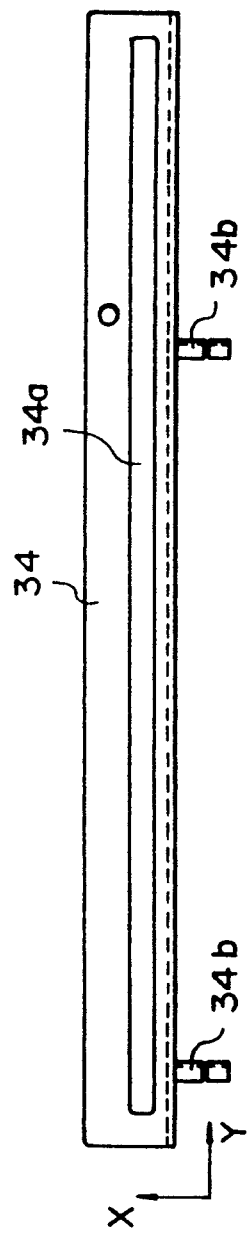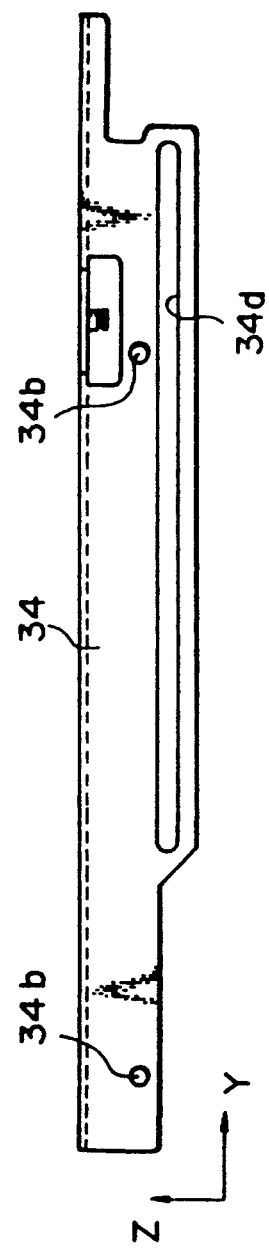
Fig. 10(a)
Fig. 10(b)

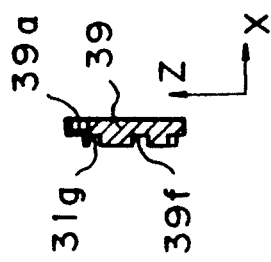
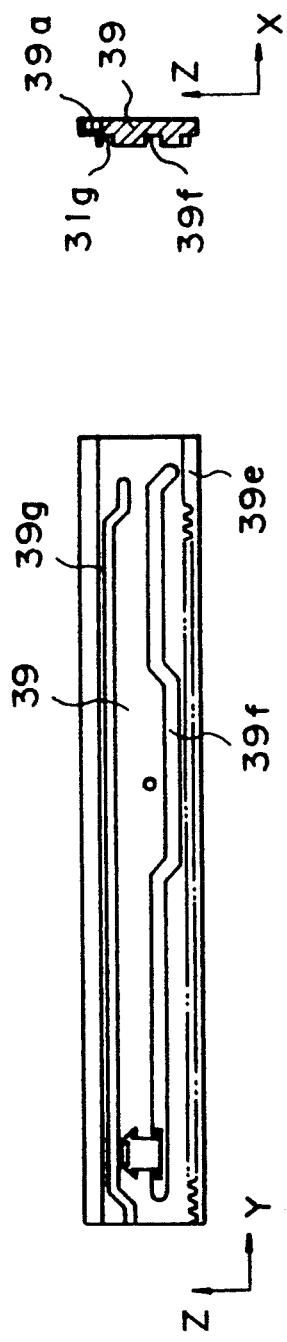
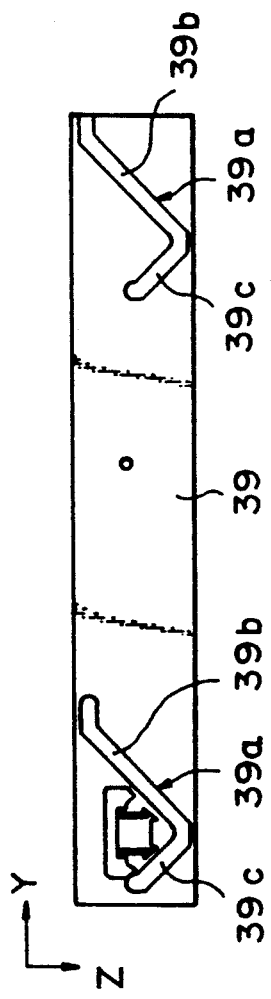

Fig. 29

FRONT LOADING DISK PLAYER

This application is a continuation of application Ser. No. 07/248,175, filed Sep. 23, 1988, now abandoned.

BACKGROUND OF THE INVENTION

1. Field of the Invention

The present invention relates to a front loading disc player.

2. Description of the Prior Art

When positioning a disc to be played back on the turntable of a front loading disc player, the disc is usually delivered in a first direction parallel to the disc carrying surface of the turntable and a second direction normal to the first direction. For delivering a disc in those directions, a conventional front loading disc player comprises, as shown in FIG. 1 of the accompanying drawings, a carrier 2 movable in the first direction (the direction of the arrow Y and the direction opposite thereto) between a projection position out of a player housing 1 and a retracted position in the player housing 1, a tray 4 movably disposed on the carrier 2 and movable in the second direction for carrying a disc 3, a carrier driver means (not shown) for moving the carrier 2 with respect to the player housing 1, and a tray driver means (not shown) for moving the tray 4 with respect to the carrier 2.

In operation, when the carrier 2 is projected out of the player housing 1, the disc 3 is placed on the tray 4 on the carrier 2, and then the carrier 2 is retracted into the player housing 1 and the tray 4 is moved toward a turntable 5 until the disc 3 is placed on the turntable 5. For retrieving the disc that has been played back, a process which is a reverse of the above operation is carried out.

The above front loading disc player is designed for playing back one disc at a time. For playing back a plurality of discs successively, disc ejecting and loading procedures have to be performed to exchange the discs, during which the playback operation is interrupted.

There has been developed a front loading disc player to solve the above problem. The developed front loading disc player includes, as shown in FIG. 2 of the accompanying drawings, two juxtaposed trays 7, 8 individually movable in one plane for carrying and delivering discs, respectively, and a playback means 9 including a turntable and an optical pickup and selectively movable between the trays 7, 8 for cooperation therewith. This front loading disc player is capable of successively playing back two discs without ejecting one of the discs after it has been played back. While the disc on the tray 7 is being played back on the turntable, the disc on the other tray 8 can be replaced with another disc. Therefore, by repeating such disc replacements alternately on the trays 7, 8, a number of discs can successively be played back uninterruptedly.

One problem with the front loading disc player shown in FIG. 2 is that the relative positional relationship between the optical pickup and the turntable may easily vary because the playback means 9 including the optical pickup is reciprocally moved between the two trays 7, 8.

SUMMARY OF THE INVENTION

In view of the aforesaid drawbacks of the conventional front loading disc players, it is an object of the present invention to provide a front loading disc player capable of replacing discs while a disc is being played back, so that discs can successively be played back without interruption.

According to a first feature of the present invention, a disc delivery mechanism for delivering a disc onto the turntable has two trays for carrying respective discs, juxtaposed in a direction substantially normal to the disc carrying surface of the turntable and movable into a projected position out of the player housing and a retracted position in the player housing, and a guide and driver means for guiding and moving the trays into the playback position, the retracted position, and the projected position. While one of the trays is in the playback position, the guide and driver means positions the other tray in either the stored position or the projected position.

According to a second feature of the present invention, a disc delivery mechanism for delivering a disc onto the turntable comprises at least one guide member having upper and lower guides extending in a plane substantially parallel to the central axis of rotation of the turntable and along a plane crossing the central axis of rotation, upper and lower trays engaging the upper and lower guides, respectively, and movable into and out of the player housing and movable in the player housing, and a driver means for moving the upper and lower trays along the guides. The upper and lower guides have vertical portions disposed near the innermost portions thereof and extending downwardly in a plane crossing the disc carrying surface of the turntable. The driver means selectively moves the upper and lower trays toward the lower ends of the vertical portions of the upper and lower guides.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 8(a) and 8(b) are top and bottom views, respectively, of a tray;

FIGS. 9 through 21 are detailed views of components of the internal structure shown in FIGS. 4 through 7;

FIGS. 22 through 35 are views explaining operation of the front loading disc player shown in FIGS. 3 through 21.

DETAILED DESCRIPTION OF THE PREFERRED EMBODIMENTS

Figure 1:
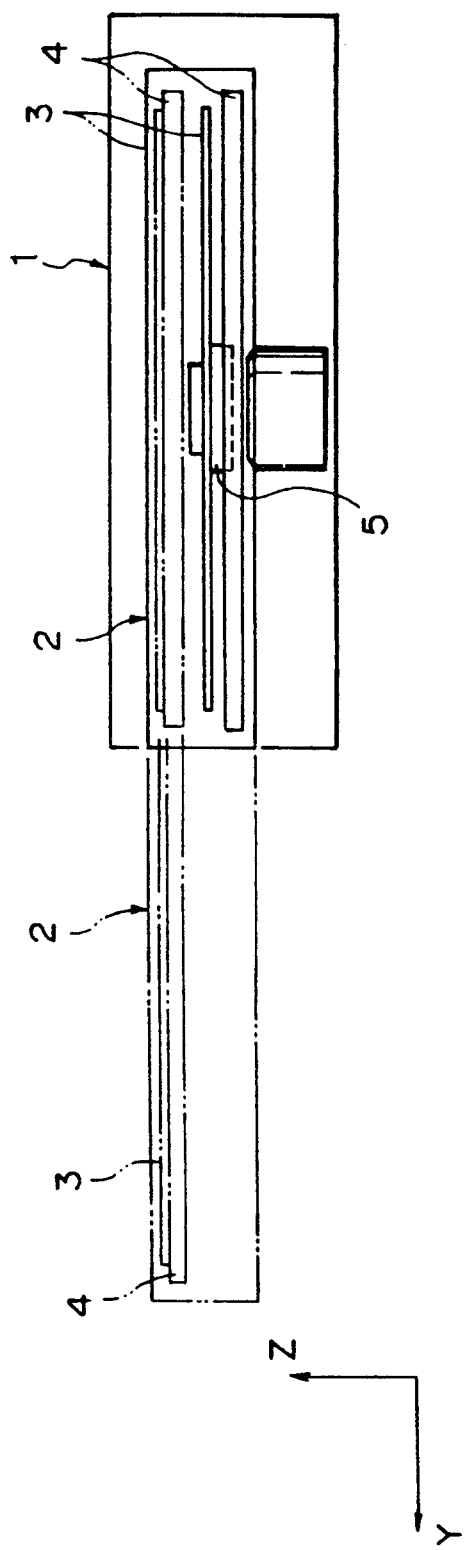
FIGS. 1 and 2 are views showing conventional front loading disc players.
Figure 2:
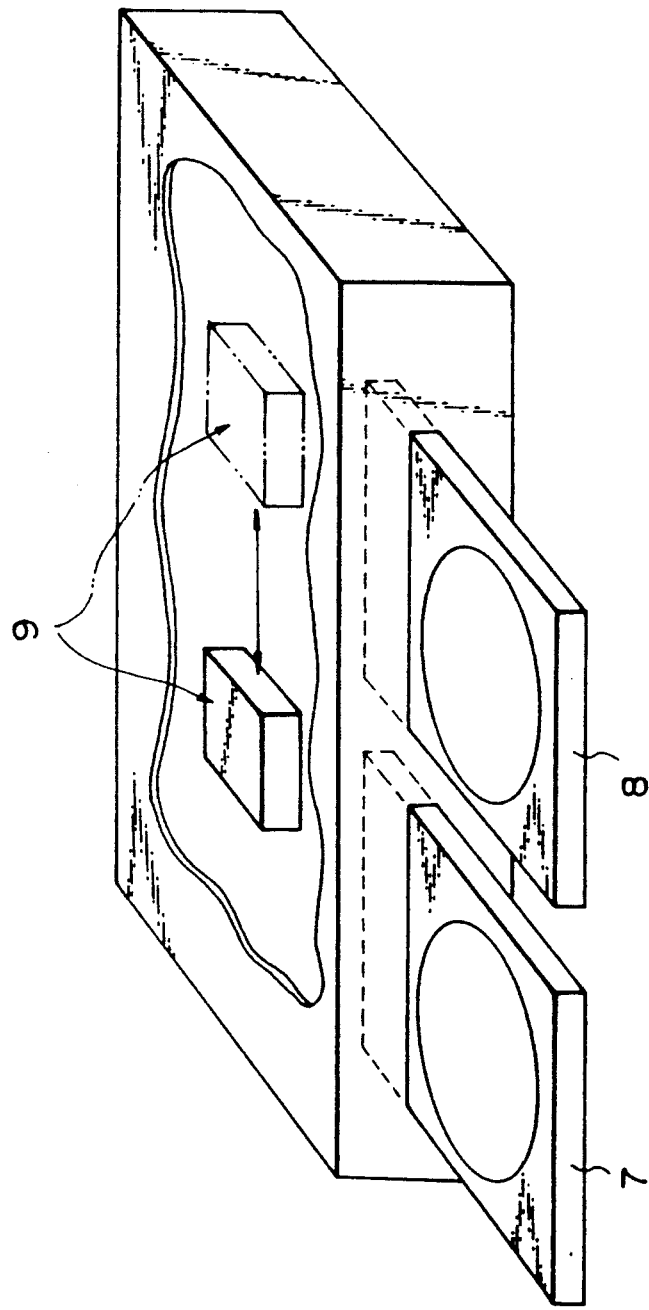
Figure 3:
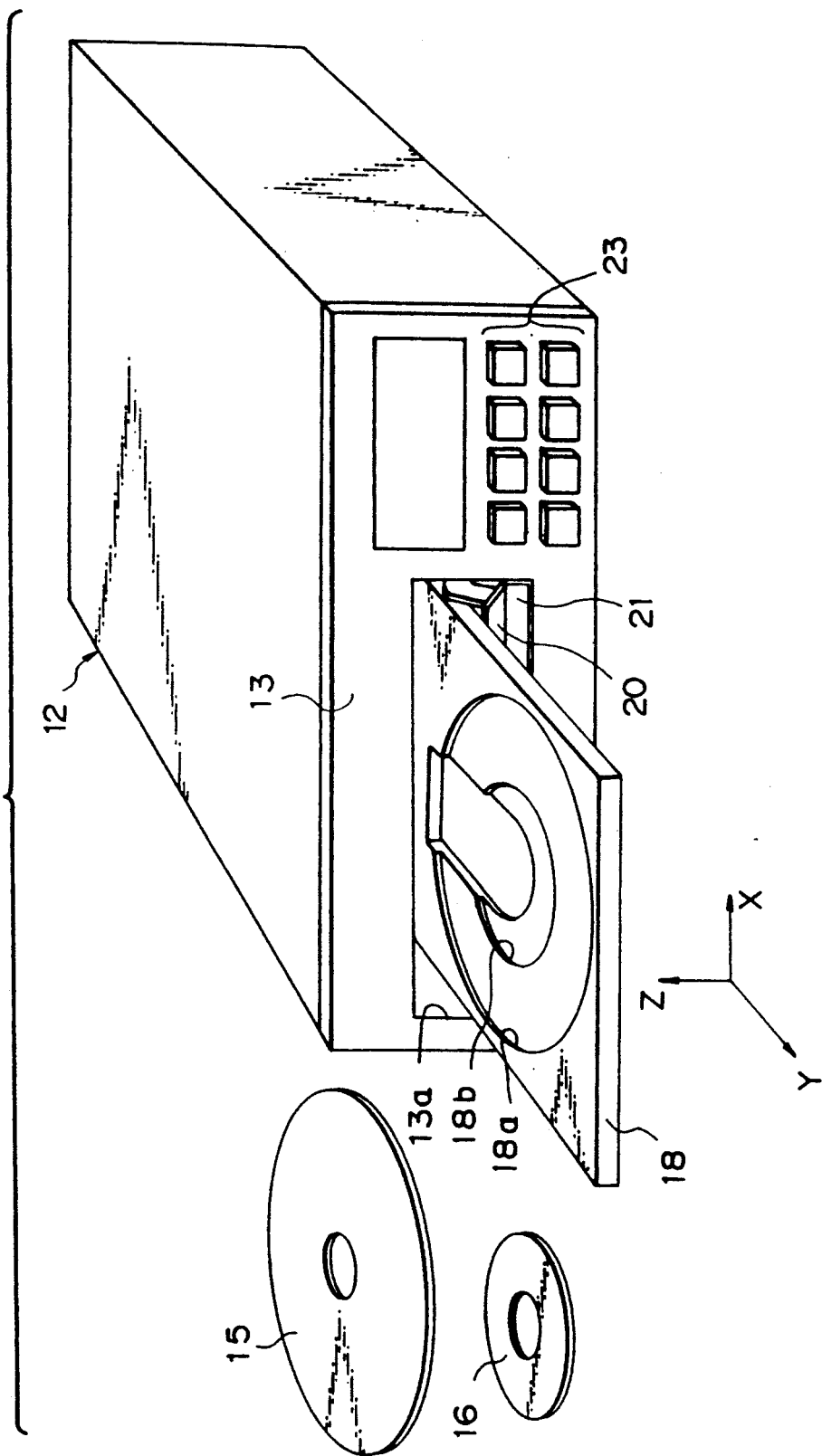
FIG. 3 is a perspective view of a front loading disc player according to the present invention.
Figure 4:
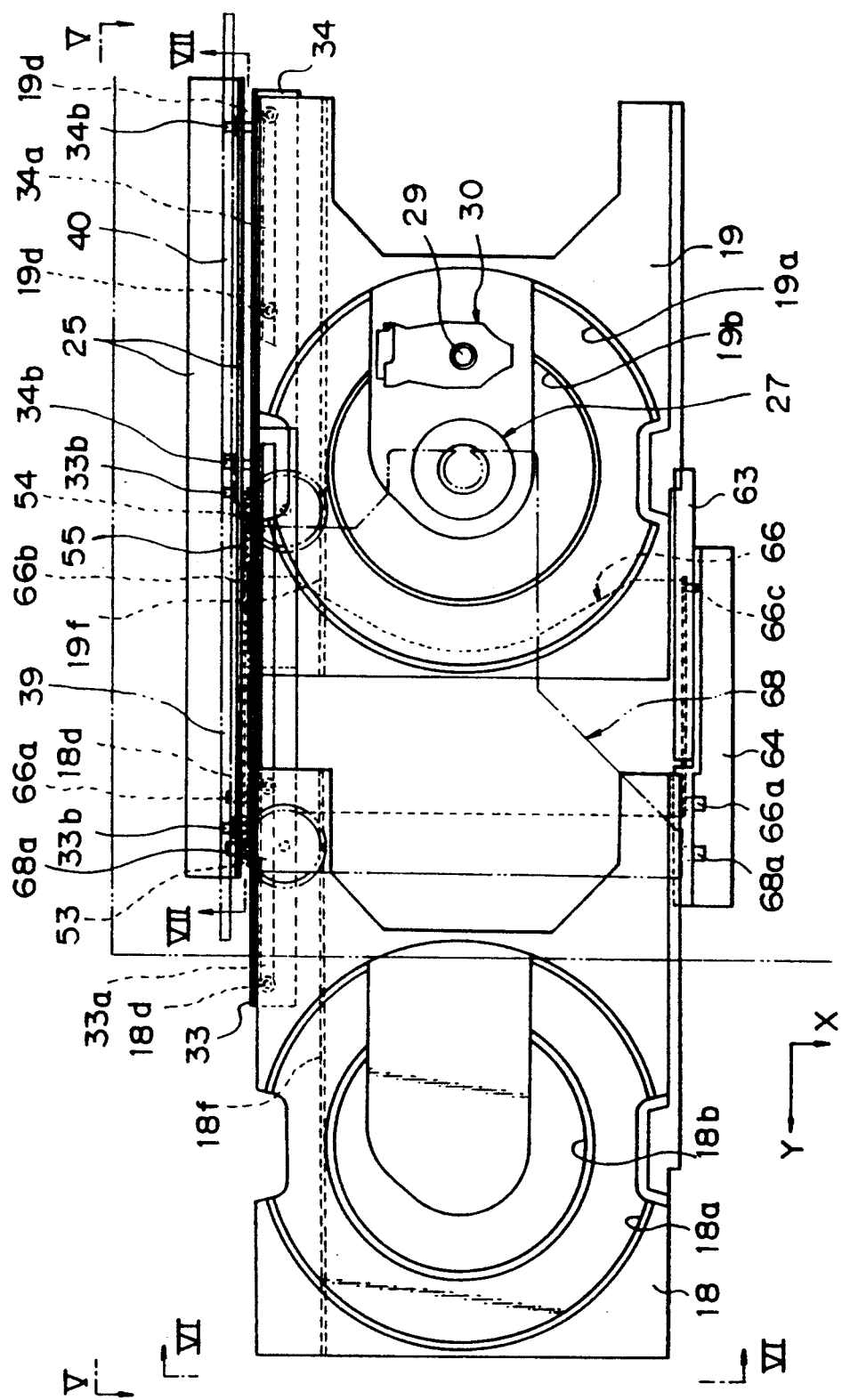
FIG. 4 is a plan view of an internal structure of the front loading disc player shown in FIG. 3.
Figure 5:
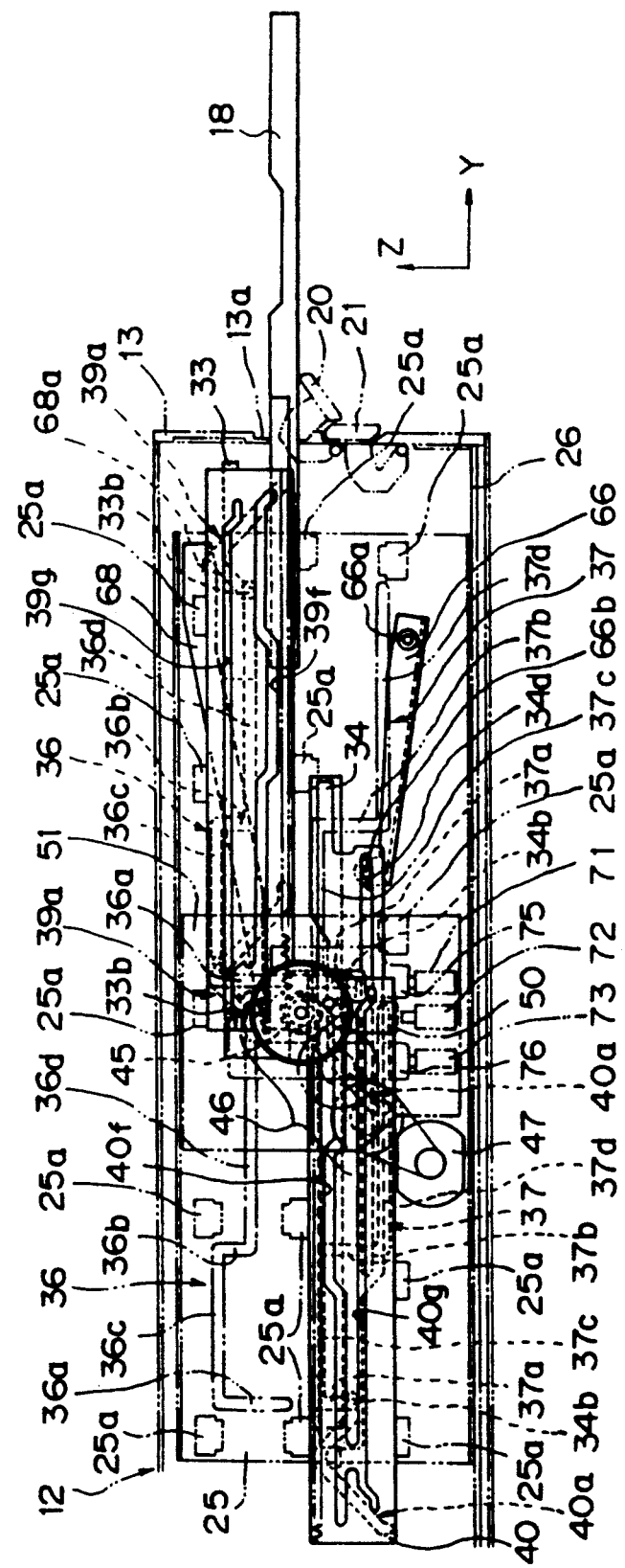
FIGS. 5 through 7 are cross-sectional views taken along line V—V, VI—VI, and VII—VII, respectively, of FIG. 4.

As shown in FIGS. 3 through 5, a front loading disc player of the present invention has a player housing 12 including a front panel 13 which has an elongate rectangular disc supply slot 13a extending horizontally for allowing upper and lower trays 18, 19 for carrying discs 15, 16 to be played back to be projected therethrough out of the player housing 12. In FIGS. 3 through 5 and other figures, the arrow Y represents a forward direction, the arrow X a leftward direction, and the arrow Z an upward direction, with respect to the front loading disc player. The disc 15 is a compact disc, for example, having a diameter of about 12 cm, whereas the disc 16 has a diameter of about 8 cm. The trays 18, 19 are juxtaposed in directions normal to the disc carrying surface of a turntable (described later), i.e., vertical directions (the direction of the arrow Z and the direction opposite thereto). The trays 18, 19 have two larger and smaller recesses 18a, 18b, and two larger and smaller recesses 19a, 19b, respectively, defined concentrically therein for placing the discs 15, 16 respectively therein. A pair of upper and lower doors 20, 21 is swingably mounted on the front panel 13 near the disc supply slot 13a for closing the same. The doors 20, 21 are openable and enclosable in synchronism with the movement of the trays 18, 19 into and out of the player housing 12. A group of switches 23 are mounted on the front panel 13 for controlling operation of the front loading disc player.

Figure 6:
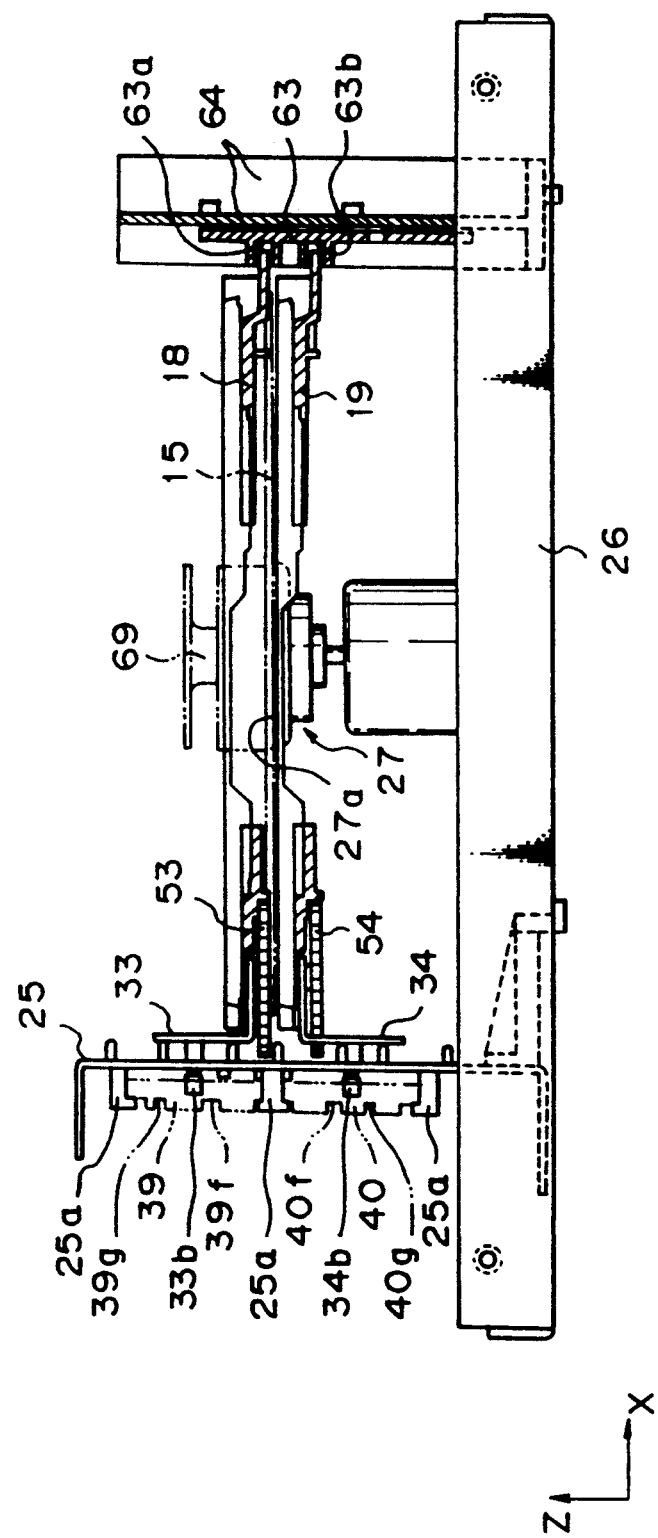
Figure 7:
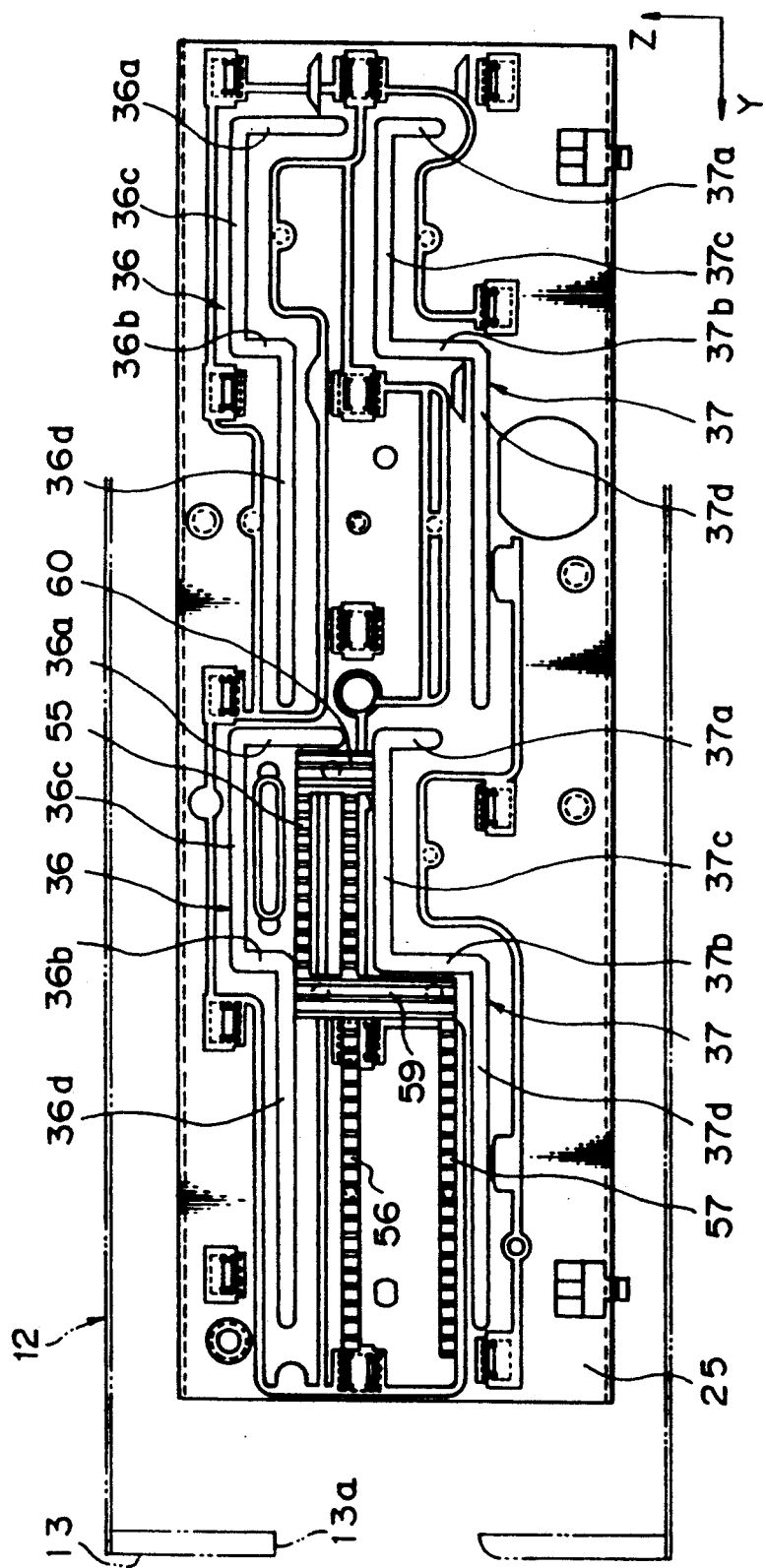

As also shown in FIGS. 6 and 7, a vertical chassis 25 serving as a guide member comprising a steel plate, for example, is disposed in the player housing 12. As shown in FIG. 6, the vertical chassis 25 is fixedly mounted on a horizontal chassis 26.

As illustrated in FIGS. 4 and 6, a fixed-location turntable 27 is mounted on the horizontal chassis 26. As shown in FIG. 4, a carriage 30 carrying an optical pickup including an objective lens 29 is mounted on the horizontal chassis 26 for movement along the recording surface of a disc placed on the turntable 27. A carriage driver means (not shown) is provided for moving the carriage 30.

A guide driver means for guiding and moving the upper and lower trays 18, 19 into a projected position out of the player housing 12 and a retracted position in the player housing 12 and also into a playback position will be described below. The upper and lower trays 18, 19 are substantially identical in shape, and are shown in detail in FIGS. 8(a) and 8(b).

As shown in FIGS. 4 through 6, upper and lower plates 33, 34 are mounted on the lefthand side surface of the vertical chassis 25. The upper and lower trays 18, 19 are movably supported at their righthand side ends on the respective upper and lower plates 33, 34 for movement parallel to the disc carrying surface 27a (FIG. 6) of the fixed-location turntable 27, i.e., in the forward and rearward directions (the direction of the arrow Y and the direction opposite thereto). The upper and lower plates 33, 34 are shown in detail in FIGS. 9(a), 9(b), 10(a), and 10(b). The upper and lower plates 33, 34 have oblong holes 33a, 34a defined respectively therein along the longitudinal direction thereof. The upper and lower trays 18, 19 have respective pins 18d, 19d projecting on the righthand side ends thereof and slidably engaging in the oblong holes 33a, 34a, respectively.

As shown in FIGS. 4 through 6, 9(a), 9(b), 10(a), and 10(b), the upper and lower plates 33, 34 have respective pairs of pins 33b, 34b projecting on the righthand sides thereof and spaced apart in the forward and rearward directions (the direction of the arrow Y and the direction opposite thereto). These pins 33b, 34b are slidably fitted in front and rear pairs of upper and lower crank-shaped guide slots 36, 37 defined in the vertical chassis 25. Therefore, the upper and lower plates 33, 34 are movable along the upper and lower guide slots 36, 37. The upper and lower guide slots 36, 37 extend in a plane parallel to the central axis of rotation of the fixed-location turntable 27 (FIG. 6) and along a plane normal to the central axis of rotation thereof, i.e., in the forward and rearward directions (the direction of the arrow Y and the direction opposite thereto). More specifically, the upper and lower guide slots 36, 37 have in their rear ends first vertical portions 36a, 37a extending downwardly along a plane normal to the disc carrying surface of the turntable 27 (FIG. 6), and also have in positions forward of the rear ends second vertical portions 36b, 37b extending parallel to the first vertical portions 36a, 37a. Between the first vertical portions 36a, 37a and the second vertical portions 36b, 37b, the guide slots 36, 37 have first flat portions 36c, 37c extending in the forward and rearward directions (the direction of the arrow Y and the direction opposite thereto). The guide slots 36, 37 also have second flat portions 36d, 37d extending continuously from the second vertical portions 36b, 37b toward the disc supply slot 13a, i.e., in the forward direction.

Figure 12B:
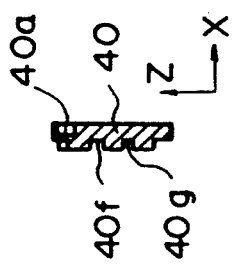

As shown in FIGS. 4 through 6, upper and lower racks 39, 40 are disposed as driven members in the form of rectangular plates, the vertical chassis 25 being sandwiched between the upper and lower plates 33, 34 and the upper and lower racks 39, 40. The upper rack 39 is shown in detail in detail in FIGS. 12(a) through 12(c). The upper and lower racks 39, 40 are mounted on supports 25a of the vertical chassis 25 for reciprocating movement in the forward and rearward directions (the direction of the arrow Y and the direction opposite thereto). The pins 33b, 34b projecting on the outer sides of the upper and lower plates 33, 34 extend through the upper and lower guide slots 36, 37 defined in the vertical chassis 25 and slidably engage in inverted V-shaped cam grooves 39a, 40a, respectively, defined in the lefthand sides of the upper and lower racks 39, 40. As shown in FIGS. 11(c), 12(c), 13, and 14, the cam grooves 39a, 40a comprise pairs of continuous slanted portions 39b, 39c and 40b, 40c which are inclined at prescribed angles to the first vertical portions 36a, 37a and the second vertical portions 36b, 37b of the upper and lower guide slots 36, 37. Thus, the cam grooves 39a, 40a are shaped such that upon movement of the upper and lower racks 39, 40 in the forward and rearward directions (the direction of the arrow Y and the direction opposite thereto), the upper and lower plates 33, 34 are moved along the upper and lower guide slots 36, 37.

Figure 13:
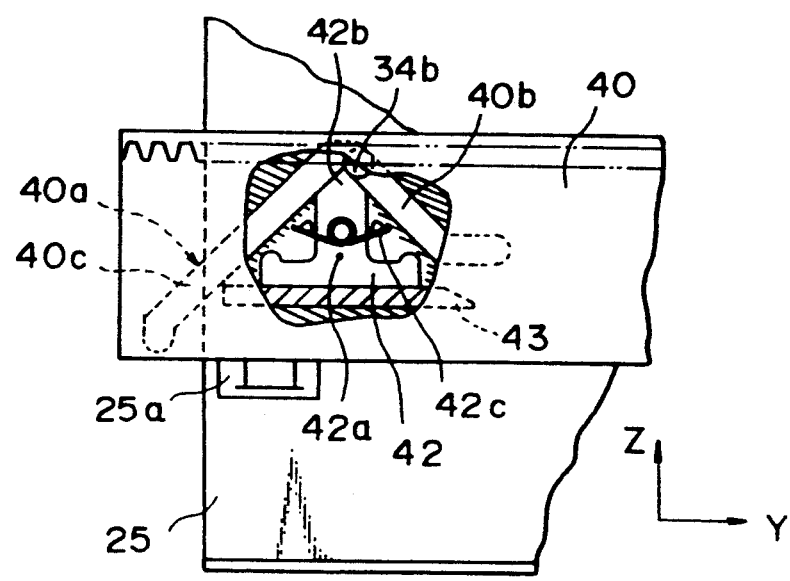
Figure 14:
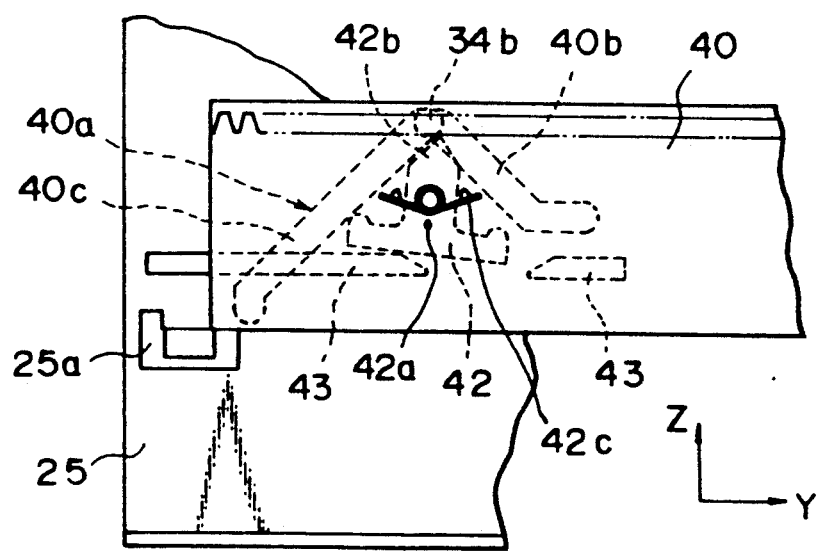

As shown in FIGS. 13 and 14, a swingable member 42 is swingably attached to the lower rack 40 adjacent to the junction between the slanted portions 40b, 40c of each of the cam grooves 40a, the swingable member 42 being swingable about a hypothetical central axis 42a. The swingable member 42 has a pointed head 42b on its free end which projects into the junction between the slanted portions 40b, 40c. A spring 42c is mounted on the swingable member 42 to impart returning forces to the swingable member 42. The vertical chassis 25 has a straight cam member 43 against which the swingable member 42 is slidably held, the cam member 43 extending in the directions in which the upper rack 40 is movable, i.e., in the forward and rearward directions (the direction of the arrow Y and the direction opposite thereto). As shown in FIG. 14, the straight cam member 43 has a recess 43a, thus serving as a swingable member driver means for swinging the swingable member 42 in response to movement of the upper rack 40. The straight cam member 43 and the swingable member 42 including the spring 42c jointly constitute a guide means for guiding the pin 34b of the lower plate 34 alternatively into one of the slanted portions 40b, 40c of the cam groove 40a. If the pin 34b were to be moved along the lower guide slot 37 only by the cam groove 40a without such a guide means, then when the lower rack 40 is moved in the forward direction (the direction of the arrow Y), for example, the pin 34b which has been lifted in the first vertical portion 37a of the lower guide slot 37 by the slanted portion 40b of the cam groove 40a would not enter the first flat portion 37c, but would be lowered in the first vertical portion 37a again by the other slanted portion 40c. The guide means prevents the pin 34b from being lowered back upon movement of the lower rack 40. Therefore, when the lower rack 40 is moved in the forward direction, for example, the pin 34b is lifted in the first vertical portion 37a of the lower guide slot 37 by the slanted portion 40b of the cam groove 40a, and at the time the pin 34b has completed its lifting movement, the pin 34b is prevented from being lowered back into the first vertical portion 37c. Then, the pin 34b is horizontally moved in the forward direction along the first flat portion 37c of the lower guide slot 37, and then is lowered into the second vertical portion 37b by the other slanted portion 40c of the cam groove 40. Thereafter, the pin 34 is horizontally moved in the second flat portion 37d for projecting the tray. The guide means including the swingable member 42 is disposed not only on the lower rack 40, but also on the upper rack 49.

Figure 12A:
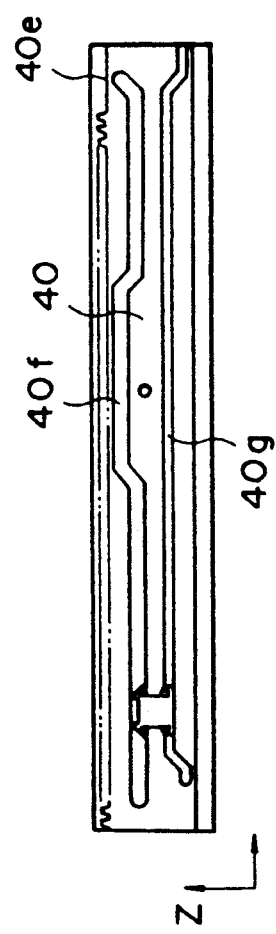
Figure 12C:
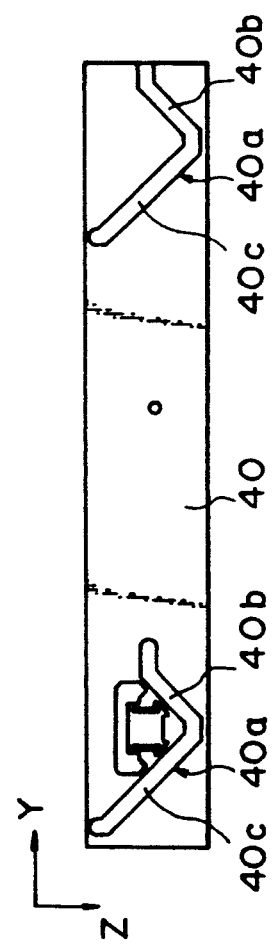
Figure 15B:
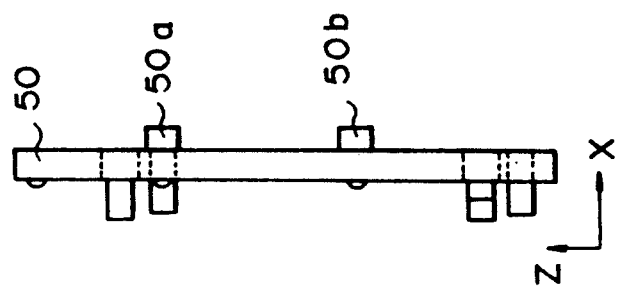
Figure 15A:
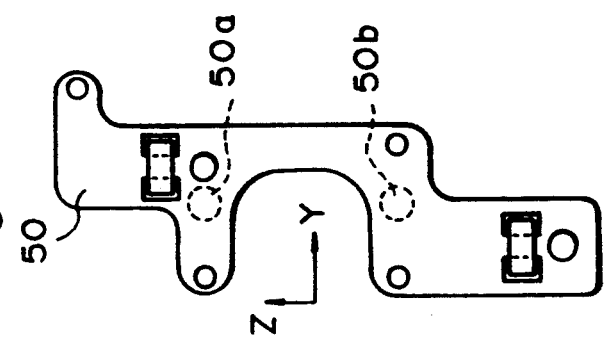

As shown in FIG. 5, the upper and lower racks 39, 40 can differentially mesh with a single pinion 45 as a driver member. The pinion 45 is rotatable by a motor 47 through a speed reducer mechanism 46 comprising a plurality of gears. As illustrated in FIGS. 11(a) and 12(a), the upper and lower racks 39, 40 have tooth-free portions 39e, 40e on their respective front ends. As shown in FIGS. 11(a), 11(b), 12(a), and 12(b), the upper and lower racks 39, 40 have cam grooves 39f, 40f, respectively, defined in their righthand sides and extending the entire length of these racks. FIG. 5 shows a cam follower 50 which engages in the cam grooves 39f, 40f at all times, the cam follower 50 being vertically (in the direction of the arrow Z and the direction opposite thereto) movably mounted on a subchassis 51 fixed to the vertical chassis 25. The cam follower 50 is shown in detail in FIGS. 15(a) and 15(b). The cam follower 50 has a pair of upper and lower pins 50a, 50b slidably engaging in the respective cam grooves 39f, 40f. The cam follower 50 and the cam grooves 39f, 40f jointly serve as a starter means for moving one of the upper and lower racks 39, 40 into a position meshing with the pinion 45 when the other rack reaches a prescribed position. For example, when the upper rack 39 meshing with the pinion 45 is moved a prescribed distance while the lower rack 40 is not in mesh with the pinion 45 due to the tooth-free portion 40e, the lower rack 40 is moved a certain distance in the forward direction (the direction of the arrow Y) into mesh with the pinion 45, whereupon the lower rack 4 starts moving differentially with respect to the upper rack 39. The same operation is also carried out when the upper rack 39 is not in mesh with the pinion 45 due to its tooth-free portion 39e. Conversely, one of the upper and lower racks 39, 40 may be brought out of mesh with the pinion 45 in response to movement of the other rack.

With this arrangement, the upper and lower racks 39, 40 as a pair of driven members can differentially and selectively be driven by the single motor 47 without having to provide individual drive sources for the respective upper and lower racks.

Figure 8B:
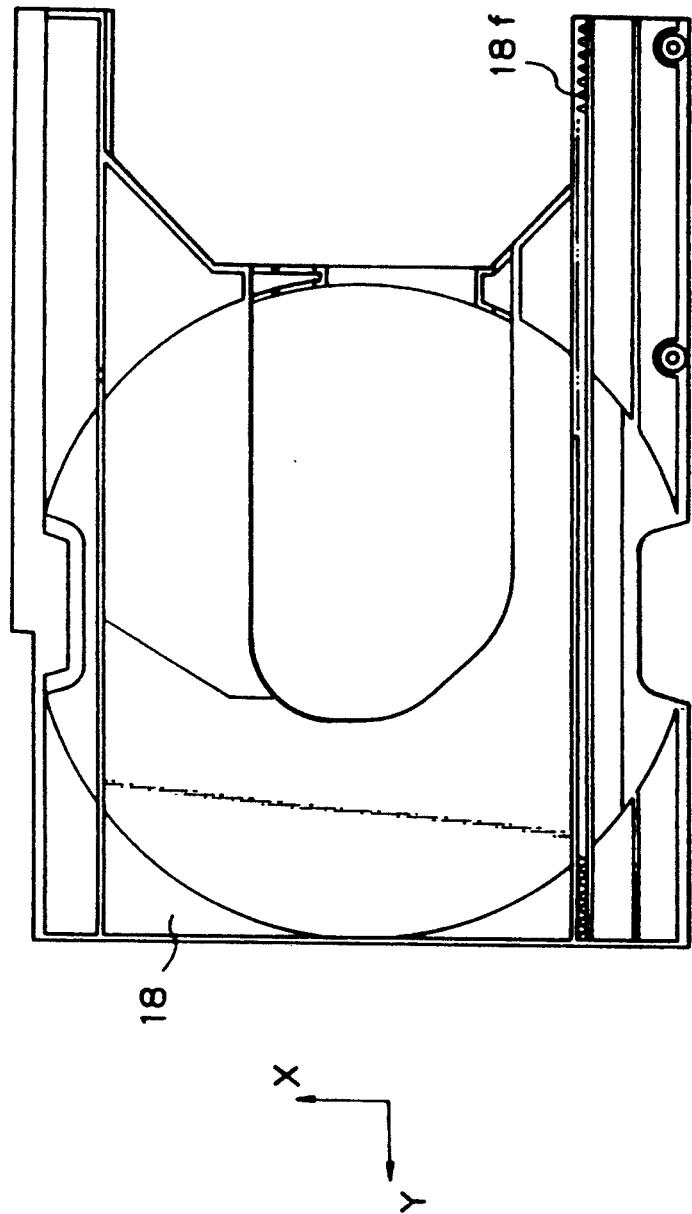

As shown in FIGS. 4 and 6, gears 53, 54 are rotatably mounted on the lower surfaces of the upper and lower plates 33, 34 by which the righthand ends of the upper and lower trays 18, 19 are supported for movement in the forward and rearward directions (the direction of the arrow Y and the direction opposite thereto). As shown in FIGS. 4 and 5, racks 55, 56, 57 are disposed on the lefthand side of the vertical chassis 25. The gears 53, 54 can mesh with any of these racks 55, 56, 57 dependent on vertical movement of the upper and lower plates 33, 34. The vertical chassis 25 also has transfer racks 59, 60 for transferring the gears 53, 54 between the racks 55, 56, 57 upon vertical movement of the upper and lower plates 33, 34. As illustrated in FIGS. 4, 6, and 8(b), the upper and lower trays 18, 19 have respective racks 18f, 19f on their lower surfaces which extend in the directions along which the trays 18, 19 are movable into and out of the player housing 12, i.e., in the forward and rearward directions (the direction of the arrow Y and the direction opposite thereto). The gears 53, 54 are held in mesh with these racks 18f, 19f.

The gears 53, 54, the racks 55, 56, 57, 18f, 19f, and the transfer racks 59, 60 jointly constitute a double-speed moving mechanism for moving the upper and lower trays 18, 19 in response to movement of the upper and lower plates 33, 34 at a speed which is twice the speed of movement of the upper and lower plates 33, 34.

The double-speed moving mechanism, the pinion 45, a drive source including the motor 47 and the speed reducer mechanism 46 for rotating the pinion 45, the upper and lower racks 39, 40, the upper and lower plates 33, 34, and related small components around these members jointly serve as a driver means for moving the upper and lower trays 18, 19 respectively along the upper and lower guide slots 36, 37 of the vertical chassis 25.

Figure 16A:
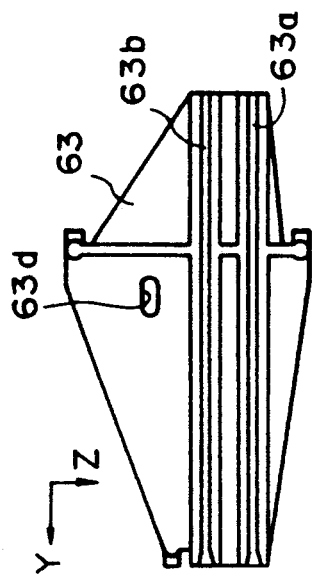
Figure 16B:
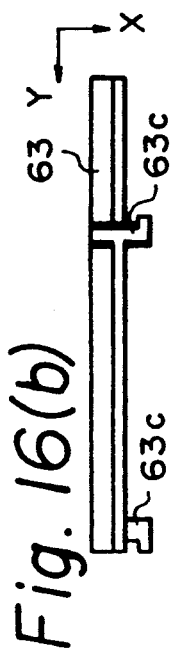
Figure 16C:
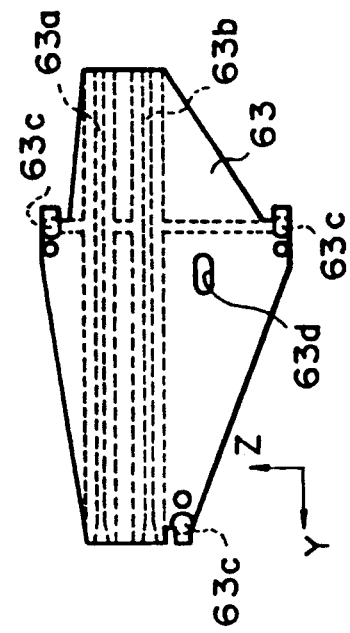
Figure 17A:
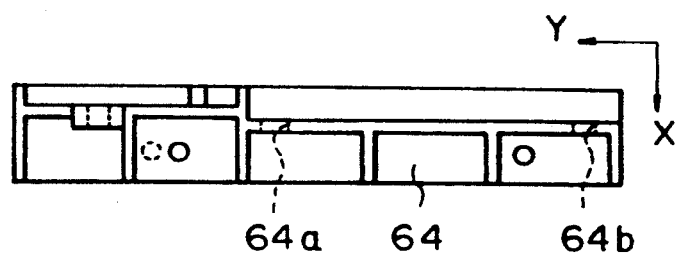
Figure 17B:
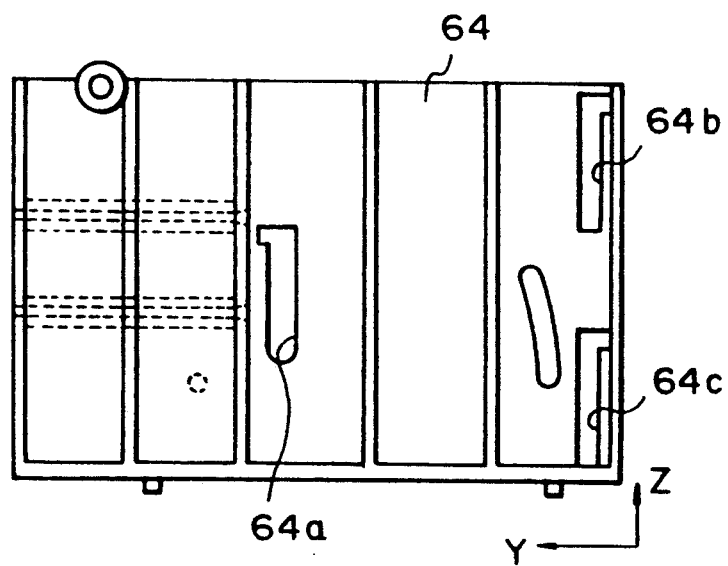

As described above, the righthand side ends of the upper and lower trays 18, 19 are guided by the upper and lower plates 33, 34. As shown in FIGS. 4 and 6, the lefthand side ends of the upper and lower trays 18, 19 are movably supported by a movable carrier member 63 for movement in the forward and rearward directions (the direction of the arrow Y and the direction opposite thereto). The movable carrier member 63 is movably mounted on the horizontal chassis 26 by a guide member 64 fixed thereto for vertical movement in the direction of the arrow Z and the direction opposite thereto. FIGS. 16(a) through 16(c) show the movable carrier member 63 in detail, and FIGS. 17(a) and 17(b) illustrate the guide member 64 in detail. As shown in FIGS. 6, 16(a) through 16(c), straight guide grooves 63a, 63b are defined on the righthand side of the movable carrier member 63, and the lefthand side ends of the upper and lower trays 18, 19 are slidably fitted in the respective straight guide grooves 63a, 63b. Three pins 63c project on the lefthand side of the movable carrier member 63 and are slidably fitted respectively in three guide slots 64a, 64b, 64c defined in the guide member 64 and extending vertically in the direction of the arrow Z and the direction opposite thereto for vertically moving the movable carrier member 63.

As shown in FIGS. 4 and 5, an interlink member 66 is disposed between the vertical chassis 25 and the guide member 64, and swingably attached thereto by means of support pins 66a for swinging movement in a plane normal to the disc carrying surface of the turntable 27.

Figure 18A:
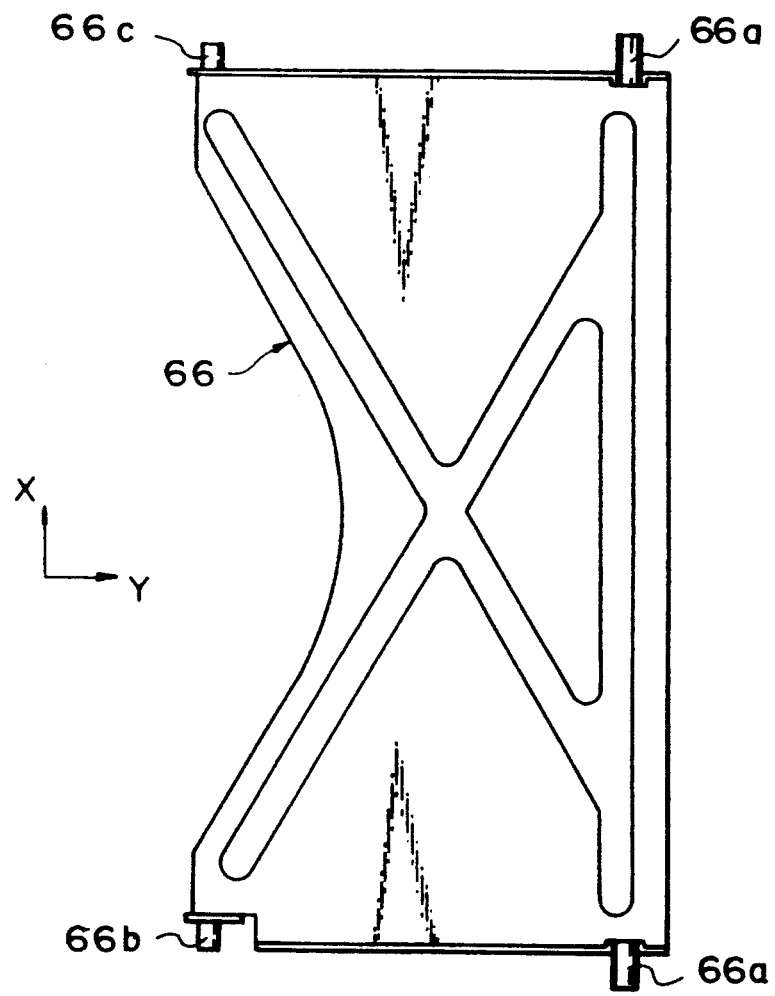
Figure 18B:
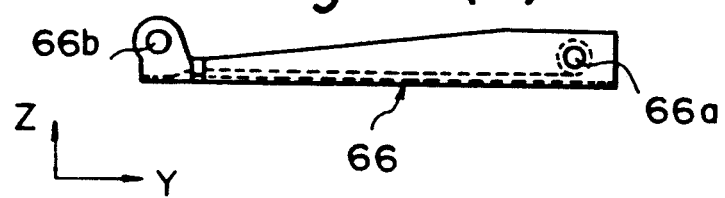

The interlink member 66 is shown in detail in FIGS. 18(a) and 18(b). The interlink member 66 has pins 66b, 66c on lateral sides of its free end. The righthand pin 66b is slidably fitted in oblong hole 34d defined in the lower plate 34 and extending in the forward and rearward directions (the direction of the arrow Y and the direction opposite thereto). The lefthand pin 66c is slidably fitted in an oblong hole 63d defined in the movable carrier member 63. Thus, as the lower plate 34 is vertically moved together with the lower tray 19 supported thereby, the movable carrier member 63 is vertically moved together with the pin 66c through the interlink member 66 serving as an interlink means. In the illustrated embodiment, a carrier member by which the lefthand side ends of the upper and lower trays 18, 19 are movably carried comprises the movable carrier member 63 and the pin 66c. The movable carrier member 63 may be dispensed with, and a pair of pins 66c may be provided for directly carrying the upper and lower trays 18, 19, respectively. The pin 66c may be integrally formed with the interlink member 66. Such an arrangement dispenses with the guide member 64 for guiding the movable carrier member 63.

The interlink means, the carrier member comprising the movable carrier member 63 and the pin 66c, the guide member 63, the other guide member or vertical chassis 25, and the driver means, described above, for moving the upper and lower trays 18, 19 along the upper and lower guide slots 36, 37 jointly constitute a guide and driver means for guiding and driving the upper and lower trays 18, 19 into the projected position out of the player housing 12 and the stored position in the player housing 12 and also into the playback position. The guide and driver means positions one of the upper and lower trays 18, 19 in either the stored position or the projected position while the other tray is in the playback position. The guide and driver means and the upper and lower trays 18, 19 jointly serve as a disc delivery mechanism for carrying and delivering a disc to be played back onto the fixed-location turntable 27 in the player housing 12. Since the complex guide and driver mechanism comprising the substantially L-shaped guide and other members is disposed on only one side end of the trays, and the other side ends of the trays are guided by only the carrier member which is vertically movable in ganged relation to the guide and driver mechanism, the number of parts used is much smaller than conventional front loading disc players in which complex guide and driver mechanisms are disposed on both sides of the trays, and hence the size and cost of the entire disc player are reduced.

The upper and lower guide slots 36, 37 defined in the vertical chassis 25 will be described in detail below.

As described above, the upper and lower guide slots 36, 37 have first and second portions 36a, 36b and first and second vertical portions 37a, 37b, respectively. When the upper tray 18, for example, is moved successively along the first vertical portion 36a, the first flat portion 36c, and the second vertical portion 36b of the upper guide slots 36 while avoiding the turntable 27, the other lower tray 19 is also moved, in ganged relation to the upper tray 18, successively along the second vertical portion 37b, the first flat portion 37c, and the first vertical portion 37a of the lower guide slot 37 while avoiding the turntable 27. Since one of the trays 18, 19 is vertically moved in response to vertical movement of the other tray, they do not physically interfere with each other upon movement even if they both overlap a plane parallel to the disc carrying surface of the fixed-location turntable 27. Since overlapping of the trays 18, 19 is possible, the size of the disc player in that plane is minimized.

As is clear from FIG. 7, the lower end of the first vertical portion 36a of the upper guide slot 36 is lower than the lower end of the second vertical portion 36b, whereas the lower end of the first vertical portion 37a of the lower guide slot 37 is higher than the lower end of the second vertical portion 37b. With this arrangement, the two trays 18, 19 are positionally adjusted vertically (in the direction of the arrow Z and the direction opposite thereto) new the disc supply slot 13a (shown in FIGS. 3, 4, and 7), so that the trays 18, 19 can be projected out of and stored into the player housing 12 in spaced-apart relationship.

A disc clamp mechanism for clamping a disc delivered by the disc delivery mechanism, described above, and placed on the turntable 27 will be described below.

Figure 19A:
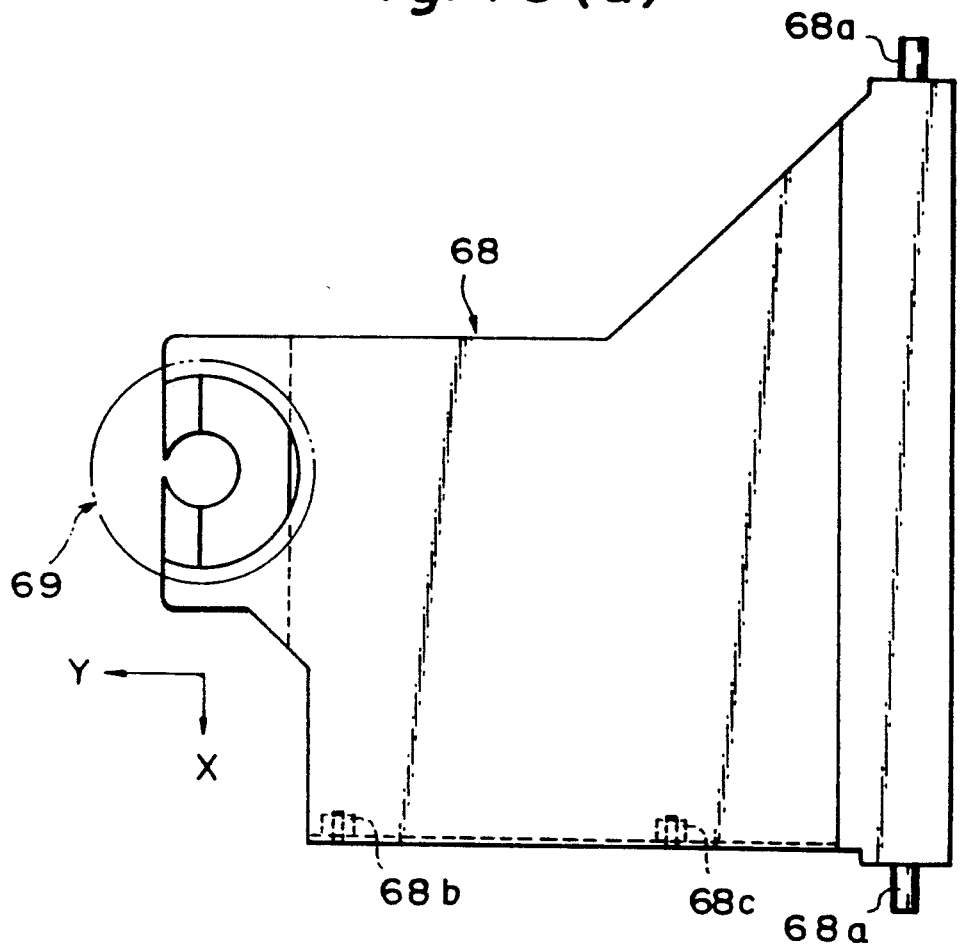
Figure 19B:
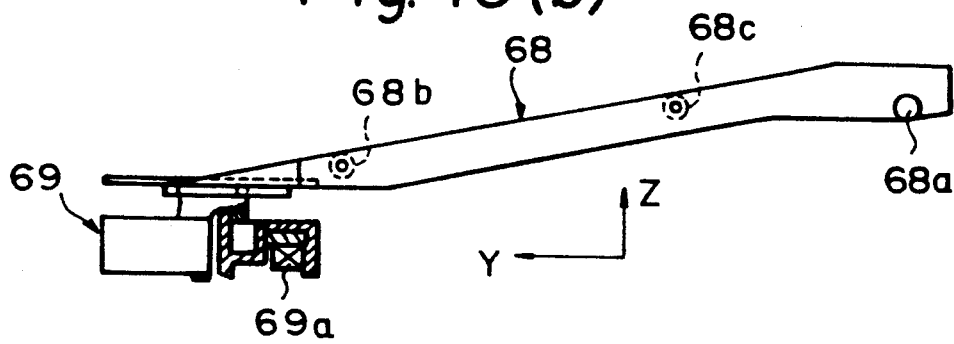
Figure 2I:
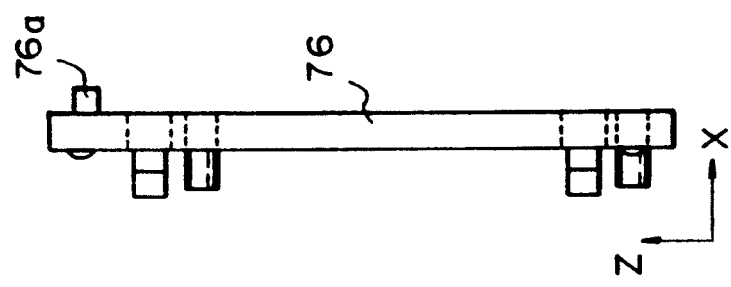
Figures 2I, 20B:
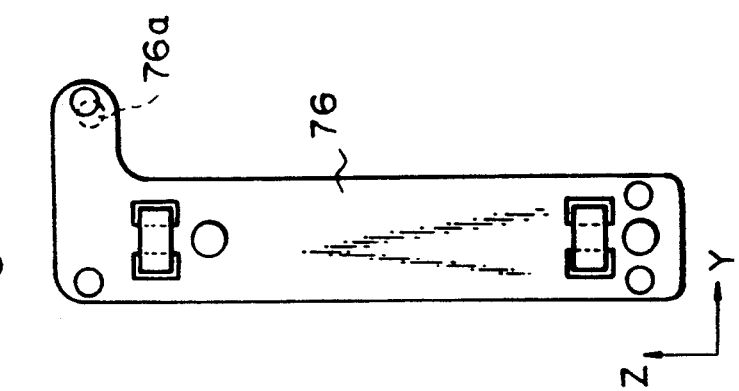
Figure 20A:
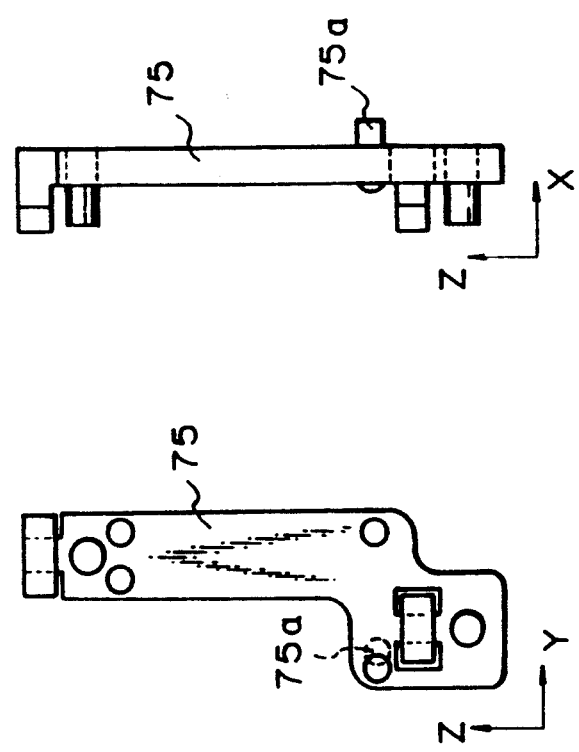

As shown in FIGS. 4 and 5, a support member 68 in the form of a flat plate is disposed above the interlink member 66. The support member 68 is swingably attached to the vertical chassis 25 and the guide member 64 by support pins 68a for swinging movement in a plane normal to the disc carrying surface of the turntable 27. FIGS. 19(a) and 19(b) show the support member 68 in detail. As illustrated in FIGS. 6, 19(a) and 19(b), a disc-shaped presser 69 is rotatably mounted on the free end of the support member 68 for pressing a disc placed on the fixed-location turntable 27 against the fixed-location turntable 27. The disc is pressed against the fixed-location turntable 27 under forces produced by a magnet 69a mounted in the presser 69 and a magnetic member (not shown) fixed to the fixed-location turntable 27. A pair of rollers 68b, 68c is mounted on a lefthand side of the free end of the support member 68 and engageable with engaging surfaces 33e, 33r (FIG. 9(b)) on the upper edge of the upper plate 33 (see FIGS. 4, 5, 6, 9(a) and 9(b)). When the upper plate 33 is vertically moved with the upper tray 18 carried thereby, the upper plate 33 pushes the rollers 68a, 68c for swinging the rollers 68b, 68c. As described later on, the upper plate 33 as an engaging member for engaging the support member 68 engages the roller 68b near the distal end of the support member 68 in a first zone of its vertical movement path, and then engages the other roller 68c positioned between the roller 68b and the support pin 68a serving as a central axis of swinging movement, in a second zone, different from the first zone, of the vertical movement path. More specifically, when the presser magnetically attracted to the turntable is released from the clamped position, the engaging member is brought into engagement with the distal end of the support member in an initial period of movement of the engaging member for thereby producing sufficient unclamping forces, and is subsequently brought into engagement with a portion of the support member closer to the central axis of swinging movement, thus shortening the time required to swing the support member. Therefore, a driving force imparting means for reciprocally moving the engaging member may be small in size, and the cost and size of the disc player may be reduced. Furthermore, the clamping operation can quickly be performed.

As shown in FIG. 5, three detector switches 71, 72, 73 are mounted on the subchassis 51 disposed alongside of the vertical chassis 25 and spaced side by side in the forward and rearward directions (the direction of the arrow Y and the direction opposite thereto), for detecting the position of the upper and lower racks 39, 40 to detect the position of the upper and lower trays 18, 19. The central detector switch 72 is turned of by being engaged by the lower end of the cam follower 50 disposed between the upper and lower racks 39, 40. Two cam followers 75, 76 are disposed forwardly and rearwardly of the cam follower 50, and mounted on the subchassis 51 for vertical reciprocating movement together with the cam follower 50. The cam follower 75 is shown in detail in FIGS. 20(a) and 20(b), and the cam follower 76 shown in detail in FIGS. 21(a) and 21(b). The detector switches 71, 73 disposed one on each side of the detector switch 72 are triggered by being engaged by the lower ends of the cam followers 75, 76, respectively. As shown in FIGS. 20(a), 20(b), 21(a), and 21(b), the cam followers 75, 76 have respective pins 75a, 76a on their lefthand sides, which slidably engage in cam grooves 39g, 40g defined in the respective upper and lower racks 39, 40. The cam followers 75, 76 are therefore vertically movable in response to movement of the upper and lower racks 39, 40.

Operation of the front loading disc player thus constructed will be described with reference to FIGS. 22 through 35.

As shown in FIGS. 3 through 5, the upper tray 18 is projected out of the player housing 12, and a compact disc 15 (FIGS. 3 and 6), for example, is placed on the upper tray 18. The process of projecting the upper tray 18 is an exact reversal of the following storing process, and hence will not be described in detail.

Figure 22:
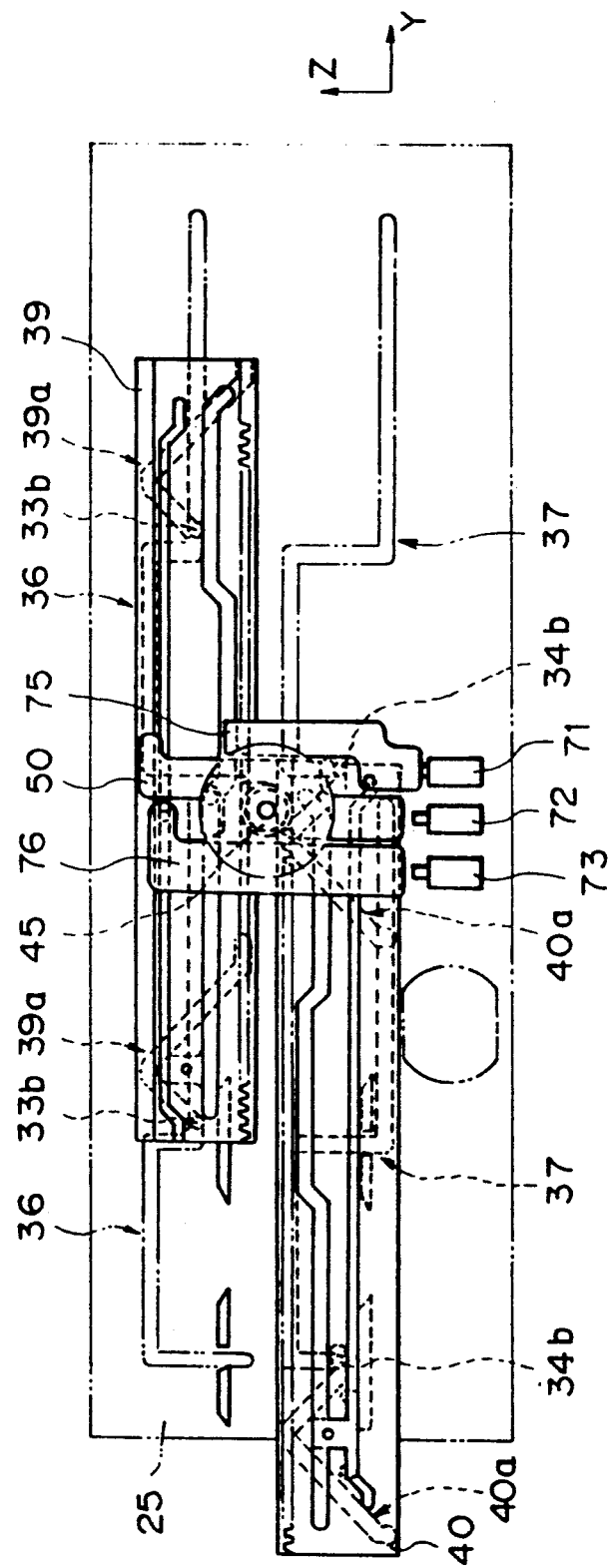
Figure 23:
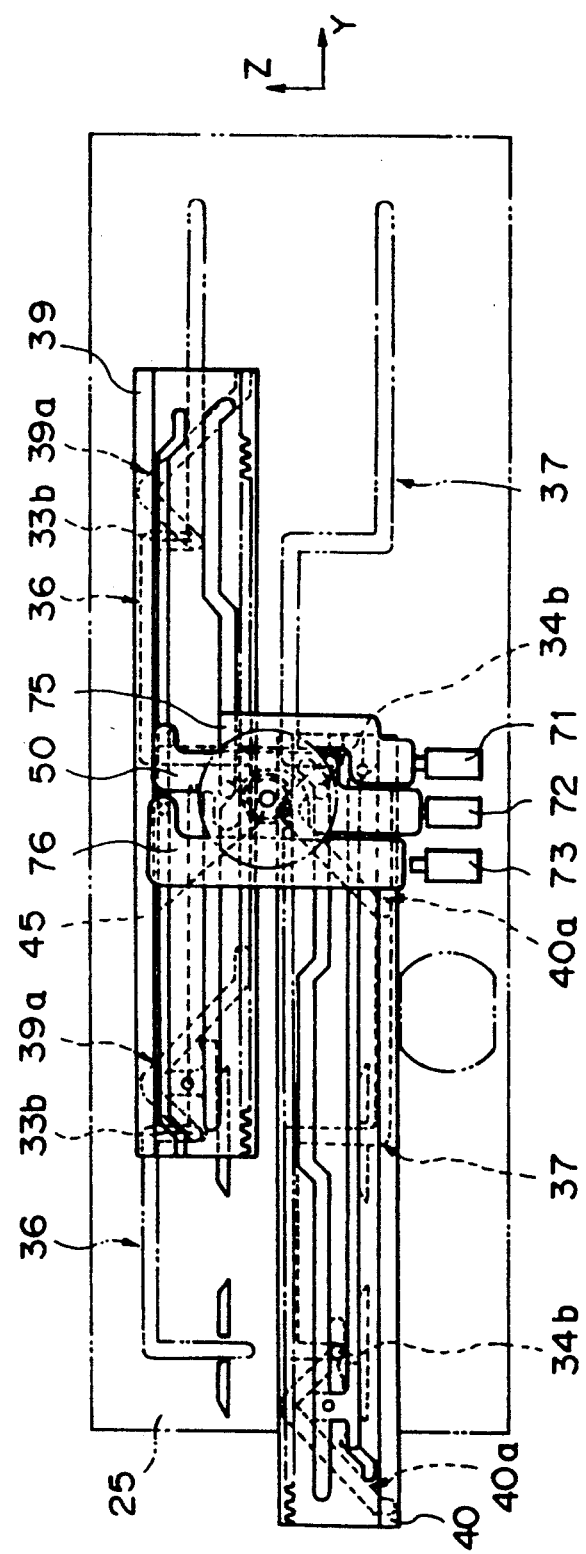
Figure 24:
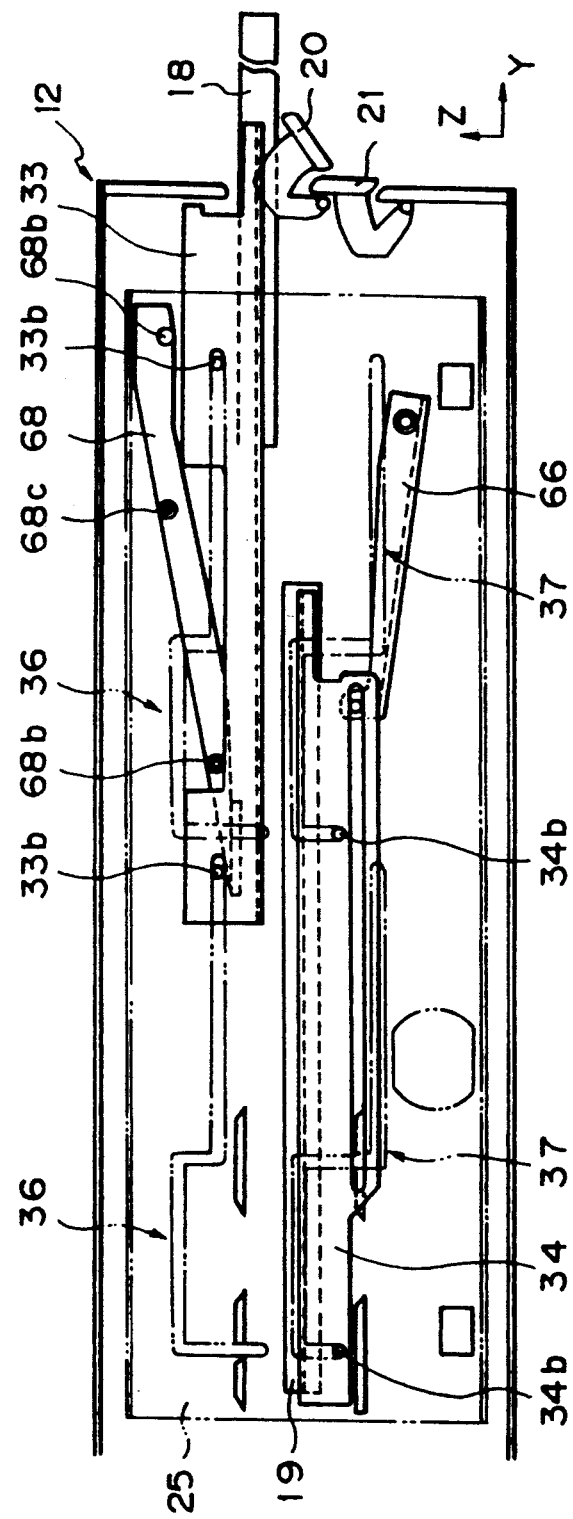
Figure 25:
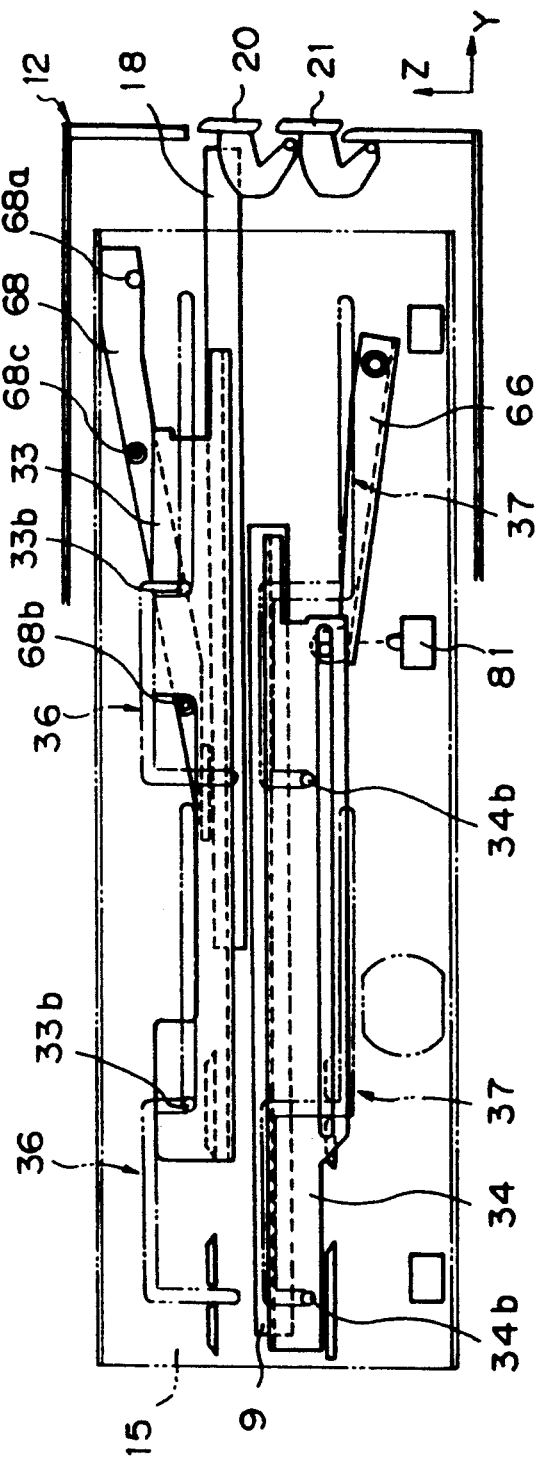
Figure 26:
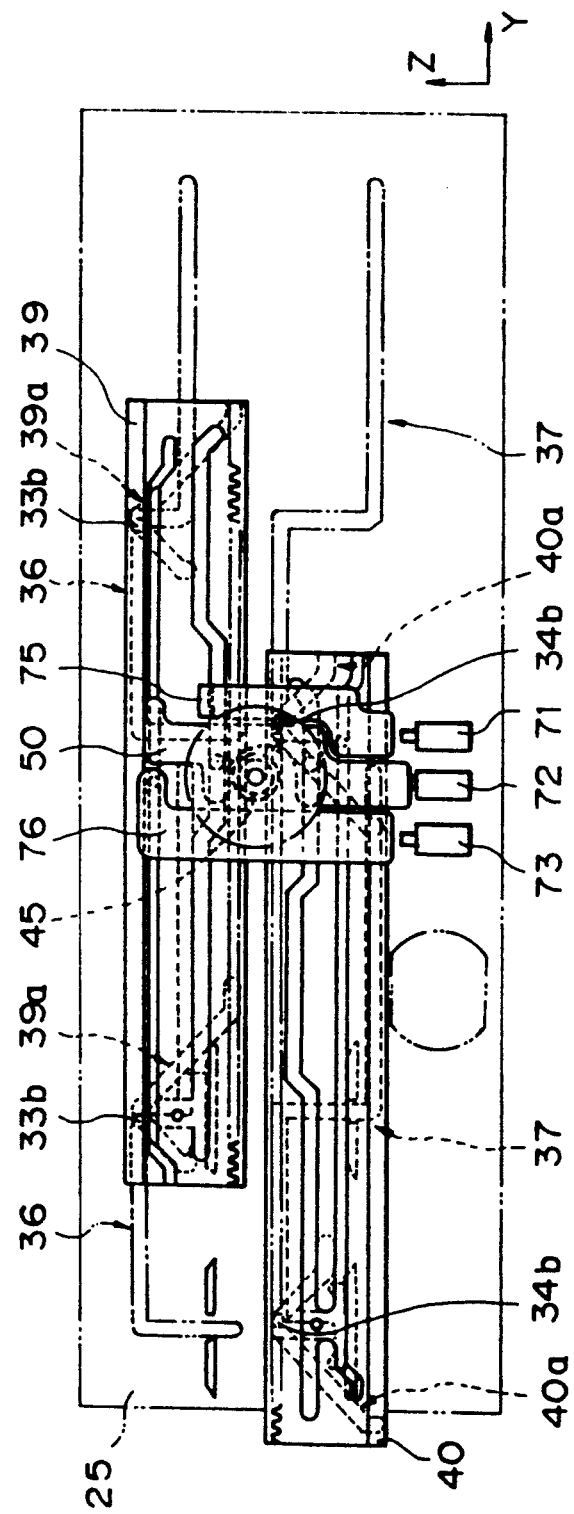
Figure 27:
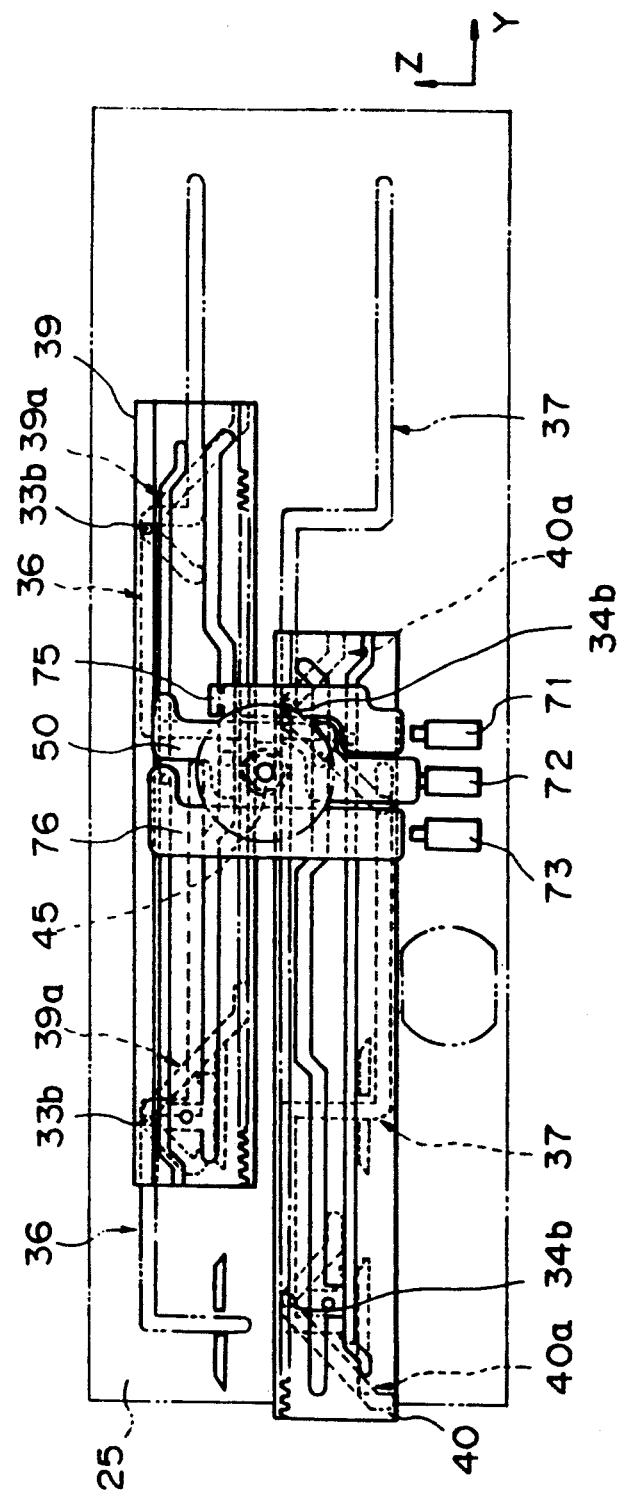
Figure 28:
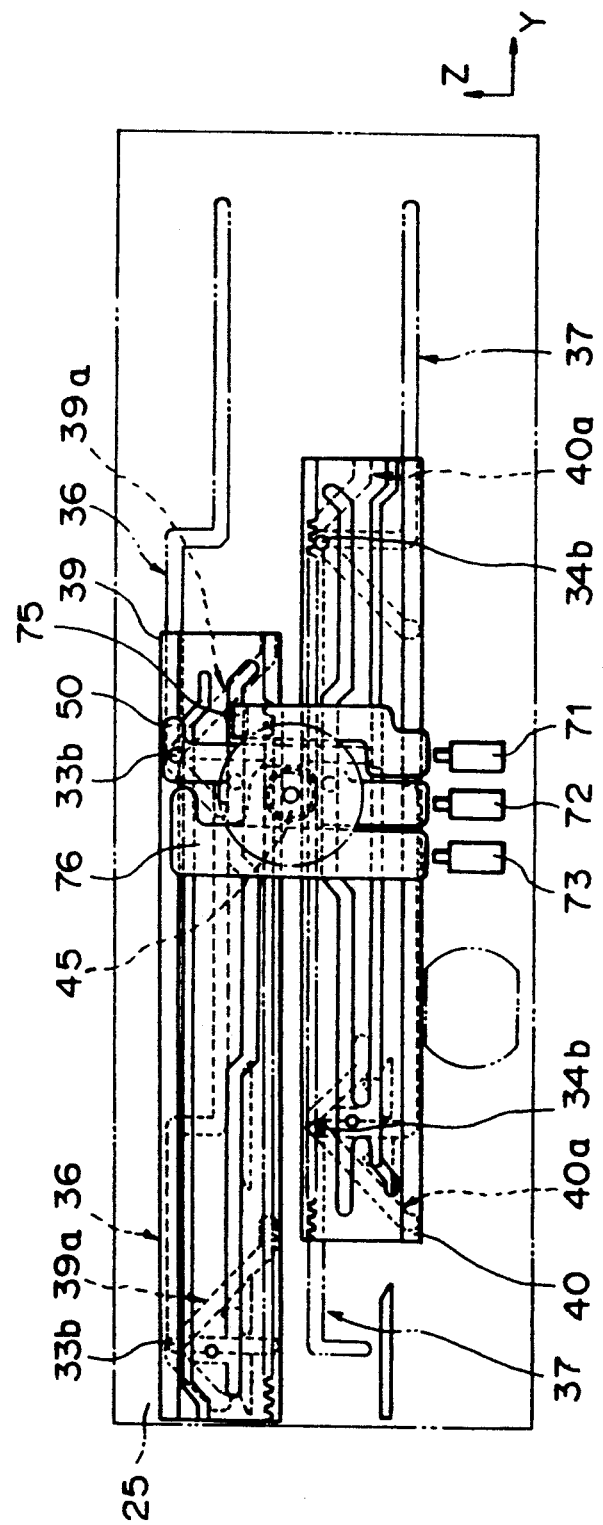

After the compact disc 15 is placed on the upper tray 18, a loading button in the switch group 23 (FIG. 3) is pushed. The motor 47 (FIG. 5) is energized to rotate the pinion 45 for thereby moving the upper rack 39 in the rearward direction (the direction opposite to the direction of the arrow Y) as shown in FIGS. 22 and 23. The upper tray 18 is now stored back into the player housing 21 by the double-speed moving mechanism at a speed which is twice the speed of movement of the upper rack 39, as shown in FIGS. 24 and 25. When the parts are in the position of FIG. 22, the lower rack 40 is out of mesh with the pinion 45 due to the tooth-free portion 39e, and hence the lower tray 19 is held in the playback position. When the upper rack 39 reaches the position illustrated in FIG. 23, the cam follower 50 is operated to move the lower rack 40 a prescribed distance in the forward direction (the direction of the arrow Y) into mesh with the pinion 45.

Figure 30:
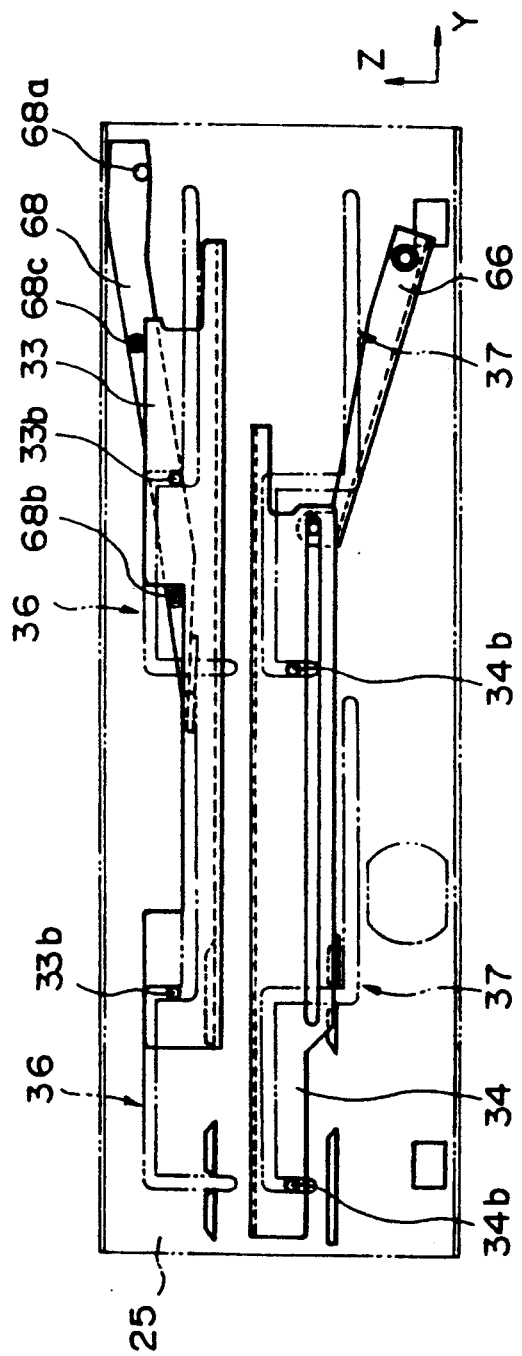
Figure 31:
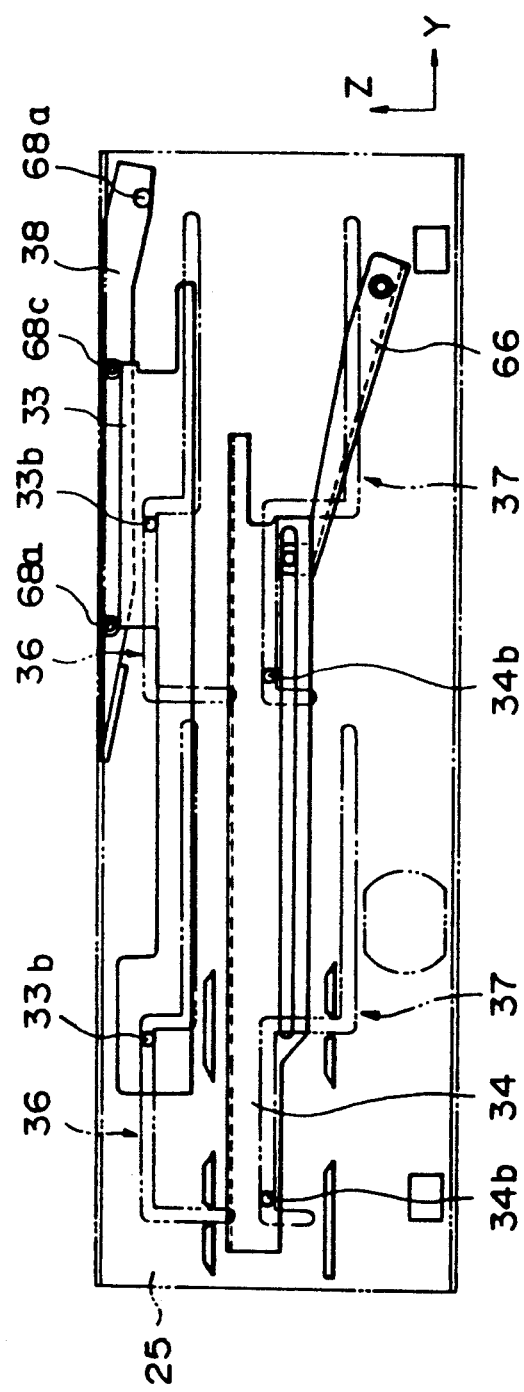
Figure 34:
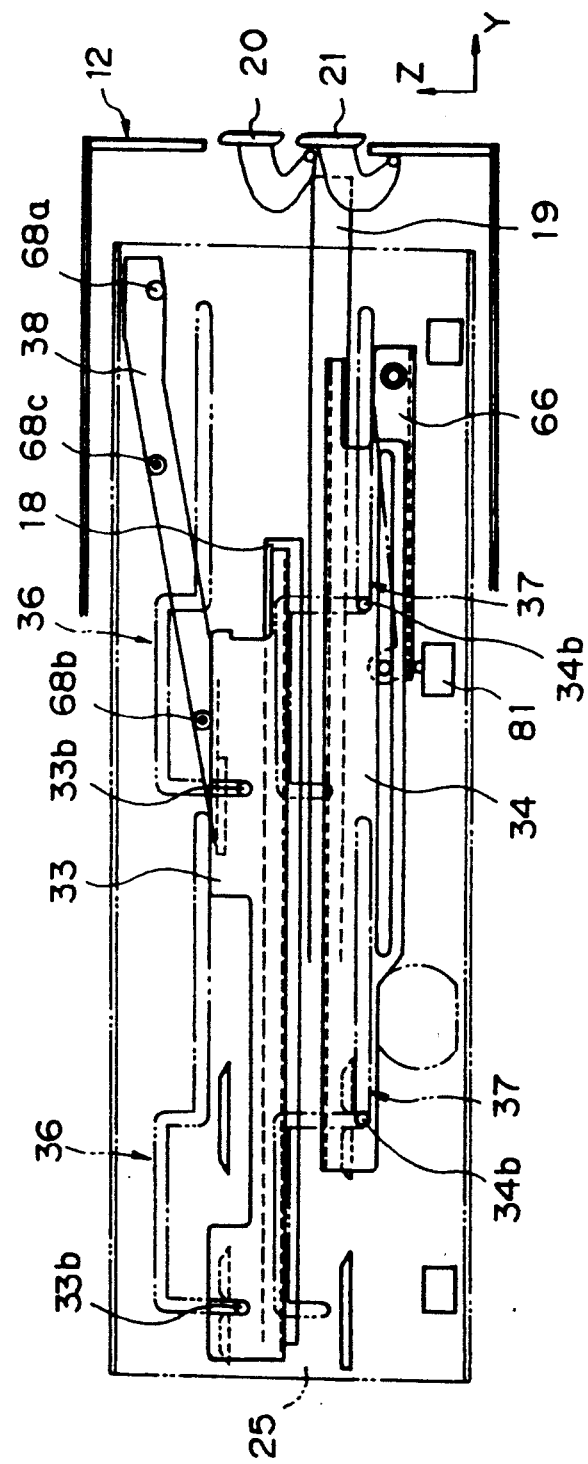
Figure 35:
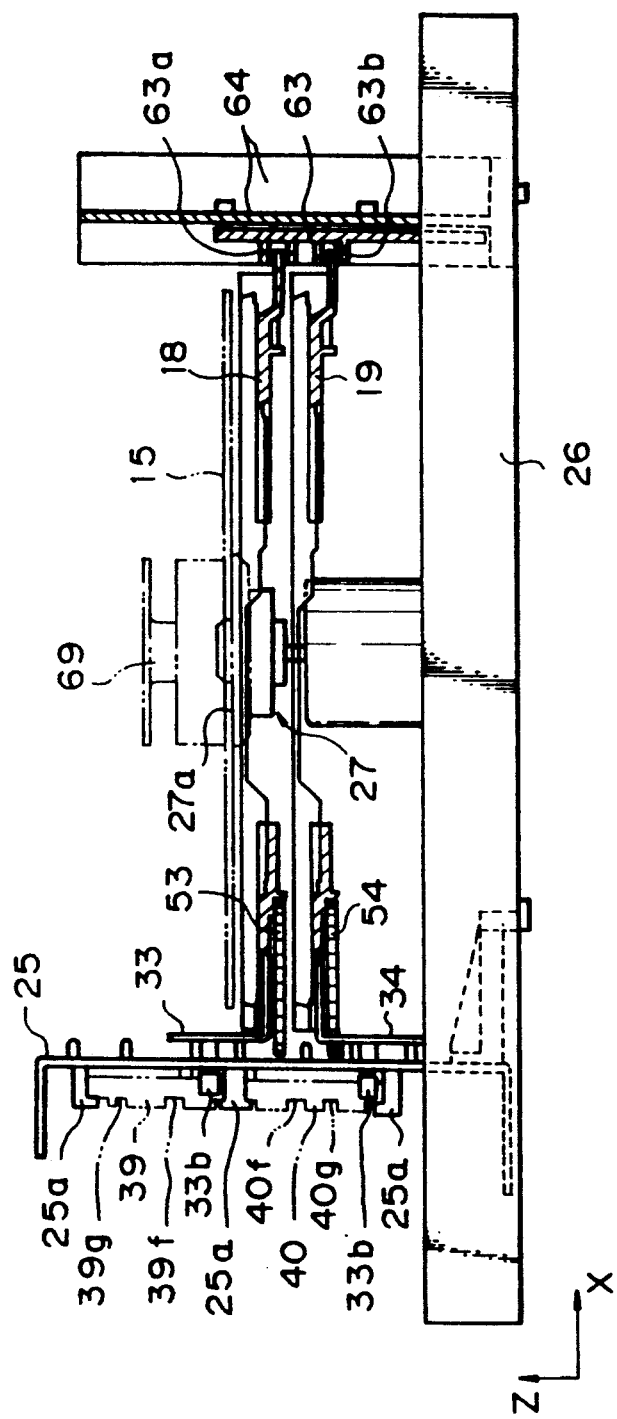

Thereafter, the pinion 45 is continuously rotated to move the upper and lower racks 39, 40 as shown in FIGS. 26 through 29. The movement of the racks causes the upper and lower plates 33, 34 to move successively along the vertical and flat portions of the upper and lower guide slots 36, 37 while avoiding the fixed-location turntable 27, as shown in FIGS. 30 through 34, until the upper tray 18 is positioned in the playback position and the lower tray 19 is in the retracted position as shown in FIGS. 34 and 35. The compact disc 15 on the lower tray 19 is placed on the fixed-location turntable 27, clamped, and played back. In FIGS. 30 and 31, however, the positions of the upper and lower trays 18, 19 are not shown.

Disc clamping operation will be described below.

Figure 32:
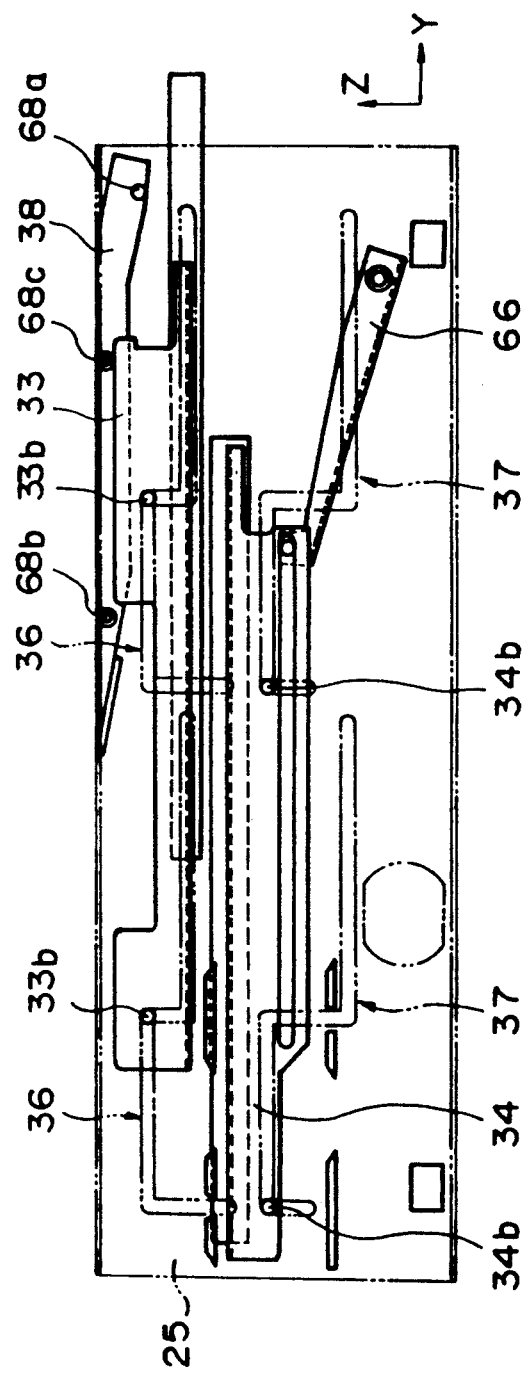
Figure 33:
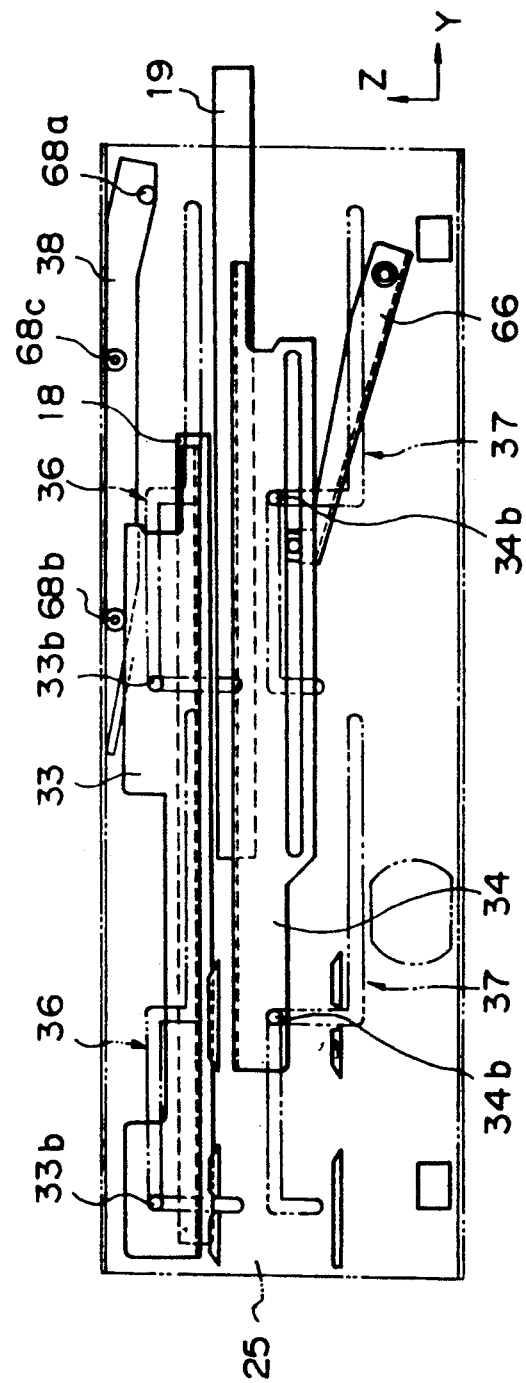

As the upper rack 39 is moved as described above, the upper plate 33 engaging the upper rack 39 through the pins 33b are moved along the upper guide slots 36. As illustrated in FIG. 25, when the upper plate 33 is moved upwardly in an initial interval, the upper plate 33 serving as the engaging member engages the roller 68b, which is a main member of the disc clamp mechanism, near the distal end of the support member 68, and pushes the roller 68b upwardly. Thus, sufficient unclamping forces are produced to release the presser 69 from the fixed-location turntable 27 easily against the magnetic forces from the magnet 69a (FIG. 19(b)). Thereafter, as shown in FIGS. 30 through 32, the upper plate 33 engages and pushes upwardly the roller 68c disposed forwardly of the roller 68b, i.e., closer to the central axis of swinging movement of the support member 38. Therefore, the support member 68 rapidly swings upwardly, for thereby unclamping the disc placed on the fixed-location turntable 27. The disc is carried on the lower tray 19 and moved back upon movement of the upper and lower trays 18, 19.

As shown in FIGS. 34 and 35, the upper tray 18 is brought into the playback position and the lower tray 19 is brought into the retracted position by the aforesaid movement. Subsequently, an eject button is pushed to eject the lower tray 19 out of the player housing 12, so that the disk on the lower tray 19 can be replaced with a new disc. At this time, the upper tray 18 is held in the playback position, and the compact disc delivered onto the fixed-location turntable 27 by the upper tray 19 can continuously be played back.

As illustrated in FIGS. 25 and 34, there is provided a photosensor 81 as a detector means for detecting a discs on the upper or lower tray 18, 19 positioned in the stored position. When the upper or lower tray 18, 19 is in the playback position, the optical pickup effects focusing operation by which it can be determined whether there is a disc on a tray in the playback position. When either tray is in the projected position, whether there is a disc on that tray can be visually confirmed. Therefore, with the single photosensor 81 being provided, it can be confirmed whether there is a disc on a tray in the playback, stored, and projected positions.

In the above embodiment, the pins 33b, 34b projecting on the upper and lower plates 33, 34 are movable along the upper and lower guide slots 36, 37 by the inverted V-shaped cam grooves 39a, 30a of the upper and lower racks 39, 40, and the pins 33b, 34b are prevented from moving back in the vertical portions of the guide slots by the swingable member 42 (see FIGS. 13 and 14). However, the present invention is not limited to such a structure, but the pins 33b, 34b may be prevented from moving back by an arrangement shown in FIG. 36.

Figure 36:
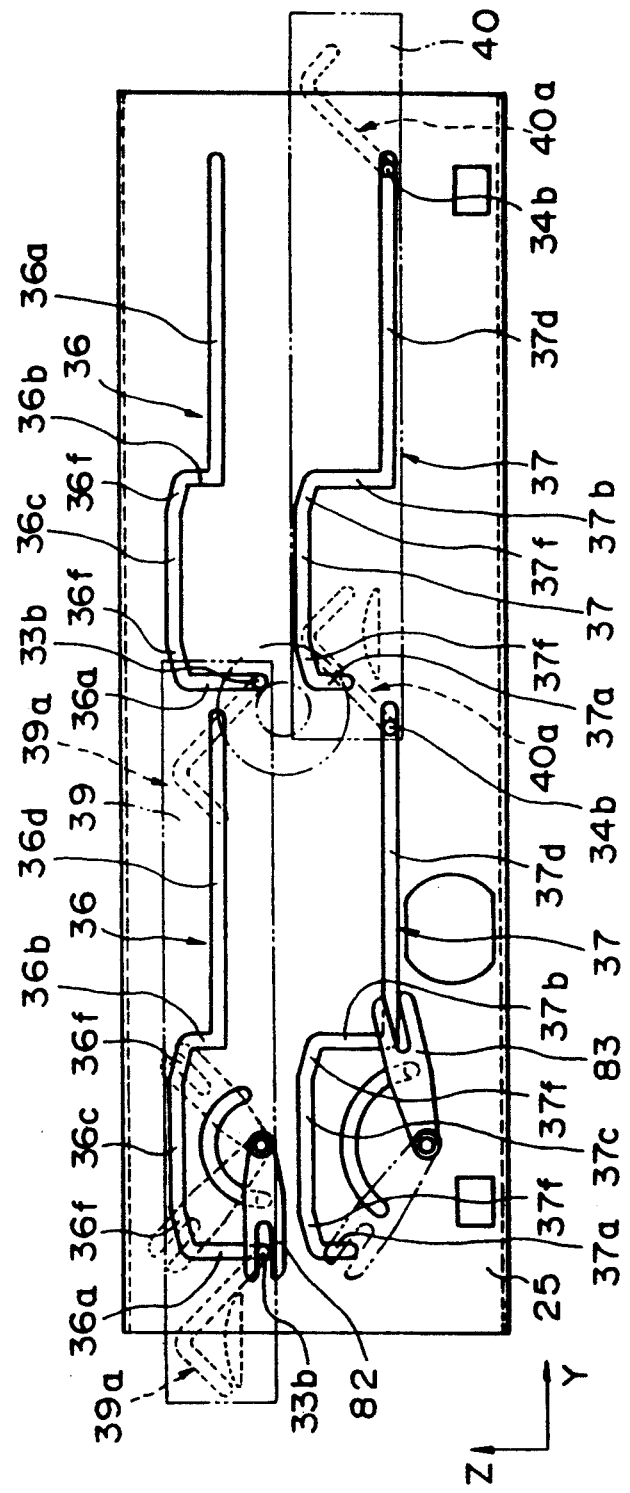
FIG. 36 is a view showing a modified front loading disc player.

In FIG. 36, each of the upper guide slots 36 includes slanted portions 36f defined between the first and second vertical portions 36a, 36b and the first flat portion 36c and inclined to these vertical and flat portions. Similarly, each of the lower guide slots 37 includes slanted portions 37f defined between the first and second vertical portions 37a, 37b and the first flat portion 37c and inclined to these vertical and flat portions. The slanted portions 36f, 37f allow the pins 33b, 34b to be transferred smoothly into the flat portions without moving back into the vertical portions. Alternatively, as shown in FIG. 36, the swingable members 42 of the preceding embodiment may be replaced with a pair of swingable members 82, 83 having bifurcated portions which are slidably fitted over the pins 33b, 34b, respectively.

According to a first feature of the present invention, as described above, the disc delivery mechanism for delivering a disc onto the turntable has two trays for carrying respective discs, juxtaposed in a direction substantially normal to the disc carrying surface of the turntable and movable into the projected position out of the player housing and the retracted position in the player housing, and a guide and driver means for guiding and moving the trays into the playback position, the retracted position, and the projected position. While one of the trays is in the playback position, the guide and driver means positions the other tray in either the stored position or the projected position.

Since the two trays are juxtaposed in the direction substantially normal to the disc carrying surface of the turntable and relatively movable alternately between the playback position and other positions, while the disc delivered by one of the trays onto the turntable is being played back, the disc on the other tray can be replaced with another disc, and such disc replacements can be effected alternately on the respective trays. Therefore, a number of discs can successively be played back uninterruptedly. Furthermore, the playback means including the turntable and the optical pickup can be fixedly positioned with respect to the playback position for the two trays. By thus fixing the playback means with respect to the playback position, the relative positional relationship between the pickup and the turntable is not impaired.

According to a second feature of the front loading disc player of the present invention, the disc delivery mechanism for delivering a disc onto the turntable comprises at least one guide member having upper and lower guides 36, 37 extending in a plane substantially parallel to the central axis of rotation of the turntable and along a plane crossing the central axis of rotation, upper and lower trays engaging the upper and lower guides, respectively, and movable into and out of the player housing and movable in the player housing, and a driver means for moving the upper and lower trays along the guides. The upper and lower guides have vertical portions disposed near the innermost portions thereof and extending downwardly in a plane crossing the disc carrying surface of the turntable. The driver means selectively moves the upper and lower trays toward the lower ends of the vertical portions of the upper and lower guides.

The first feature described above is concerned with a front loading disc player of the tray projecting type wherein each tray can be projected out of and stored into the player housing. The second feature is not limited to such a tray-projecting-type disc player, but may also be applied to a front loading disc player of the slot-in type in which a disc inserted through a slot defined in the front panel of the player housing is carried and delivered by a tray which is movable only in the player housing. With such an arrangement, the second feature offers the same advantages as those of the first feature. In addition, since each tray is guided by the guides, the structure is highly simple, and the cost can be lowered.

Although certain preferred embodiments have been shown and described, it should be understood that many changes and modifications may be made therein without departing from the scope of the appended claims.

What is claimed is:

1. A front loading disc player having a disc delivery mechanism for carrying and delivering a disc onto a fixed-location turntable in a player housing, said disc delivery mechanism comprising a pair of trays each for carrying a single disc, said trays being juxtapose in a direction substantially normal to a disc carrying surface of said fixed-location turntable, and guide and driver means for guiding and complementary moving said trays between a playback position and a retracted position, said guide and driver means further including means for positioning one of said trays in either said retracted position or a projected position while either the other is in said playback position.

2. A front loading disc player according to claim 1, further including detector means for detecting a disc on each of said trays positioned in said retracted position.

3. A front loading disc player according to claim 1, wherein said guide and driver means are adapted for moving one of said trays from the retracted position to the playback position while moving the other tray from the playback position to the retracted position.

4. A front loading disc player having a disc delivery mechanism for carrying a disc supplied through a disc supply slot and delivering the disc onto a turntable in a player housing, said disc delivery mechanism comprising a pair of trays each for carrying a single disc, at least one guide member having complementary upper and lower situated in a plane substantially parallel to a rotational axis of said turntable, upper and lower trays engaging the upper and lower guides, respectively, and driver means for moving said upper and lower trays along said upper and lower guides, said upper and lower guides having corresponding step-like shapes designed to provide paths for the complementary movement of said upper and lower trays, said upper and lower guides having respective first vertical portions of their step-like shape disposed near innermost portions thereof and extending downwardly in a plane crossing a disc carrying surface of said turntable, said driver means including means for selectively moving said upper and lower trays toward lower ends of said first vertical portions of said upper and lower guides.

5. A front loading disc player according to claim 4, wherein said upper and lower guides include outer vertical portions disposed outwardly beyond and extending parallel to said first vertical portions.

6. A front loading disc player according to claim 5, wherein a lower end of a first vertical portion of said lower guide is lower than the lower end of said other vertical portion thereof, and a lower end of a first vertical portion of said upper guide is higher than the lower end of an outer vertical portion thereof.

7. A front loading disc player according to claim 6, wherein said upper and lower guides have tray-projecting flat portions, respectively, extending from the lower ends of said other vertical portions in a direction toward said disc supply slot.

8. A front loading disc player according to claim 6, wherein said driver means comprises a single pinion, a drive source for rotating said pinion, a pair of racks movable in respective directions and capable of differentially meshing with said pinion, said racks having respective tooth-free portions and engaging said trays, respectively, through cam means, starter means for bringing one of said racks into a position for meshing with said pinion when the other rack has reached a prescribed position, said cam means including means for moving said trays in response to movement of said racks, said cam means comprising inverted V-shaped cams slidably engaging said trays and each composed of a pair of slanted portions continuously defined in said racks and inclined to said first and other vertical portions, and guide means for guiding portions of said trays engaging said inverted V-shaped cams selectively into one of said slanted positions.

9. A front loading disc player according to claim 5, wherein said driver means comprises a single pinion, a drive source for rotating said pinion, a pair of racks movable in respective directions and capable of differentially meshing with said pinion, said racks having respective tooth-free portions and engaging said trays, respectively, through cam means, starter means for bringing one of said racks into a position for meshing with said pinion when the other rack has reached a prescribed position, said cam means including means for moving said trays in response to movement of said racks, said cam means comprising inverted V-shaped cam slidably engaging said trays and each composed of a pair of slanted portions continuously defined in said racks and inclined to said first and other vertical portions, and guide means for guiding portions of said trays engaging said inverted V-shaped cams selectively into one of said slanted portions.

10. A front loading disc player according to claim 9, wherein said guide means comprises slanted portions interposed between said first vertical portions and said other vertical portions and flat portions contiguous to said vertical portions, and inclined to said first vertical portions, said other vertical portions, and said flat portions.

11. A front loading disc player according to claim 9, wherein each of said guide means comprises a swingable member swingably disposed adjacent to a junction between said slanted portions and having a free end which can be projected into said junction, and swingable member driver means for swinging said swingable member.

12. A front loading disc player according to claim 11, wherein said swingable member driver means has a cam member disposed along a direction in which said rack is movable, and held in slidable contact with said rack for swinging said swingable member in response to movement of said rack.

13. A front loading disc player according to claim 5, wherein said upper and lower guides have tray-projecting flat portions, respectively, extending from the lower ends of said other vertical portions in a direction toward said disc supply slot.

14. A front loading disc player according to claim 13, wherein said driver means comprises a single pinion, a drive source for rotating said pinion, a pair of racks movable in respective directions and capable of differentially meshing with said pinion, said racks having respectively tooth-free portions and engaging said trays, respectively, through cam means, starter means for bringing one of said racks into a position for meshing with said pinion when the other rack has reached a prescribed position, said cam means including means for moving said trays in response to movement of said racks, said cam means comprising inverted V-shaped cams slidably engaging said trays and each composed of a pair of slanted portions continuously defined in said racks and inclined to said first and other vertical portions, and guide means for guiding portions of said trays engaging said inverted V-shaped cam selectively into one of said slanted portions.

15. A front loading disc player according to claim 4, wherein said driver means comprises a single pinion, a drive source for rotating said pinion, a pair of racks movable in respective directions and capable of differentially meshing with said pinion, said racks having respective tooth-free portions and engaging said trays, respectively, through cam means, and starter means for bringing one of said racks into a position for meshing with said pinion when the other rack has reached a prescribed position, said cam means including means for moving said trays in response to movement of said racks.

* * * * *